(12) United States Patent
Kobayashi

(10) Patent No.: US 12,319,238 B2
(45) Date of Patent: Jun. 3, 2025

(54) DRAWER TYPE STORAGE BOX

(71) Applicant: Marelli Corporation, Saitama (JP)

(72) Inventor: Yousuke Kobayashi, Saitama (JP)

(73) Assignee: Marelli Corporation, Saitama (JP)

( * ) Notice: Subject to any disclaimer, the term of this patent is extended or adjusted under 35 U.S.C. 154(b) by 503 days.

(21) Appl. No.: 17/633,117

(22) PCT Filed: Jul. 27, 2020

(86) PCT No.: PCT/JP2020/028631
§ 371 (c)(1),
(2) Date: Feb. 4, 2022

(87) PCT Pub. No.: WO2021/024826
PCT Pub. Date: Feb. 11, 2021

(65) Prior Publication Data
US 2022/0289115 A1    Sep. 15, 2022

(30) Foreign Application Priority Data
Aug. 5, 2019  (JP) ................. 2019-143557

(51) Int. Cl.
*B60R 7/06*    (2006.01)
(52) U.S. Cl.
CPC ..................... *B60R 7/06* (2013.01)
(58) Field of Classification Search
CPC .. B60R 7/06; B60R 7/046; B60R 7/04; B65D 25/02; B65D 11/12; A47B 88/40; A47B 88/49; A47B 88/493; A47B 88/417; A47B 88/427; A47B 2210/0059; B60K 37/00

USPC .......... 296/37.8, 37.12, 37.1, 24.34; 384/18; 224/400, 483, 281
See application file for complete search history.

(56) References Cited

U.S. PATENT DOCUMENTS

| 2,199,898 | A | * | 5/1940 | Visser | ...................... | B60R 7/06 |
| | | | | | | 312/246 |
| 2,301,730 | A | * | 11/1942 | Mann | ...................... | B60R 7/06 |
| | | | | | | 312/301 |
| 4,852,932 | A | * | 8/1989 | Komeya | ................. | B60N 3/12 |
| | | | | | | 296/37.9 |

(Continued)

FOREIGN PATENT DOCUMENTS

CH      578851 A5      8/1976
CH      607680 A5  * 10/1978
(Continued)

*Primary Examiner* — Pinel E Romain
(74) *Attorney, Agent, or Firm* — Young Basile Hanlon & MacFarlane, P.C.

(57) ABSTRACT

A drawer-type storage box mounted on a vehicle V includes a box-shaped resin container having on a top thereof an opening portion, a slide rail that inclines relative to a width direction Y of the container, a bracket that connects the slide rail to the container, and a cover that stores the container and to which the slide rail is directly or indirectly attached, wherein the container has a contact surface that contacts the bracket and the contact surface is substantially parallel to a width direction Y of the container, wherein a fastening member mounted from the opening portion side of the container fastens the container and the bracket by the contact surface, and the container is movable in a width direction Y relative to the bracket by loosening a fastening force of the fastening member.

5 Claims, 14 Drawing Sheets

(56) References Cited

U.S. PATENT DOCUMENTS

| | | | | |
|---|---|---|---|---|
| 5,678,875 A | * | 10/1997 | Zipperle | B60R 7/04 224/281 |
| 6,896,308 B2 | * | 5/2005 | Okanda | B60R 21/045 296/187.05 |
| 6,921,118 B2 | * | 7/2005 | Clark | B60R 7/06 296/37.14 |
| 7,926,861 B2 | * | 4/2011 | Merlo | B60R 7/06 224/483 |
| 8,622,455 B2 | * | 1/2014 | Quijano | B60R 7/06 224/281 |
| 8,740,278 B1 | * | 6/2014 | Mally | B60R 7/06 296/37.8 |
| 9,771,743 B2 | * | 9/2017 | Roychoudhury | B60R 21/205 |
| 10,661,719 B2 | * | 5/2020 | McCarthy | B60N 3/08 |
| 11,518,314 B2 | * | 12/2022 | Park | B60R 7/06 |
| 11,667,243 B2 | * | 6/2023 | Son | B60R 7/06 296/37.12 |
| 11,731,548 B2 | * | 8/2023 | Park | B60R 7/06 296/37.12 |
| 11,912,191 B2 | * | 2/2024 | Parker | B60P 3/34 |
| 2007/0176455 A1 | * | 8/2007 | Kataoka | B60R 5/02 296/70 |
| 2010/0019637 A1 | * | 1/2010 | Guttinger | A47B 88/493 384/35 |
| 2012/0087604 A1 | | 4/2012 | Yu et al. | |
| 2014/0167588 A1 | * | 6/2014 | Park | A47B 88/493 312/334.6 |
| 2024/0083364 A1 | * | 3/2024 | Nishimura | B60R 7/06 |

FOREIGN PATENT DOCUMENTS

| | | | | | |
|---|---|---|---|---|---|
| CN | 102448275 | A | | 5/2012 | |
| CN | 103747705 | A | | 4/2014 | |
| CN | 104044515 | A | * | 9/2014 | B60R 7/06 |
| CN | 206983861 | U | * | 2/2018 | |
| CN | 112477765 | A | * | 3/2021 | B60R 7/06 |
| DE | 2522414 | A1 | | 1/1976 | |
| DE | 2746603 | A1 | | 4/1979 | |
| DE | 102013204547 | A1 | | 9/2014 | |
| DE | 102018008862 | A1 | * | 5/2020 | B60R 5/04 |
| EP | 3789246 | A1 | * | 3/2021 | B60R 7/04 |
| FR | 2409722 | A1 | | 6/1979 | |
| FR | 3003215 | A1 | | 9/2014 | |
| FR | 3042454 | A1 | * | 4/2017 | B60R 7/04 |
| JP | H5-24452 | U | | 3/1993 | |
| JP | H60-160749 | A | | 6/1994 | |
| JP | 2000-279246 | A | | 10/2000 | |
| KR | 10-2014-0113417 | A | | 9/2014 | |
| KR | 102695737 | B1 | * | 8/2024 | |
| WO | 2008/038472 | A1 | | 4/2008 | |

* cited by examiner

PRIOR ART

DRAWER TYPE STORAGE BOX

CROSS-REFERENCE TO RELATED APPLICATION

The present application is based on and claims priority to Japanese Patent Application No. 2019-143557, filed on Aug. 5, 2019, the disclosure of which is hereby incorporated by reference in its entirety.

TECHNICAL FIELD

This disclosure relates to a drawer-type storage box.

BACKGROUND

A drawer-type glove box (drawer-type storage box) to which a slide rail is attached is known (see e.g., CN104044515B).

The slide rail is configured to slide an inner rail relative to an outer rail through a ball. Such a slide rail has the strongest support stiffness by receiving a load along a direction (wide direction of slide rail) parallel to the rears of the outer rail and the inner rail. Accordingly, in the typical drawer, the slide rail extends along the drawing direction (i.e., in direction orthogonal to vertical direction) and the rear of the slide rail along the vertical direction is attached to the side surface of the container. The slide rail thereby receives the load in the vertical direction.

However, when such a drawer-type glove box is applied to a vehicle, it is assumed that the container may receive impact (or load) and/or vibration from the side upon drawing the container. For this reason, it is necessary to have a stiffness relative to the impact from the side. This can be addressed by inclining the slide rail relative to the vertical direction.

In CN104044515B, as shown in a partial vertical sectional view of FIG. 12, the side surface of the container 104 is provided with an inclined portion, and the inclined slide rail 105 is disposed between the inclined side surface and a bottom surface 112 of a cover 107.

The object of CN104044515B is to solve the following problem.

More specifically, when the container 104 having a size in the width direction Y larger than that in the height direction is formed by a resin, the differential shrinkage in the forming increases relative to the width direction Y. For this reason, when the container 104 is assembled to the cover 107 through the inclined slide rail 105, the attachment position of the container 104 relative to the cover 107 significantly varies in the vertical direction Z due to the differential shrinkage of the container 104 in the width direction Y.

For example, when the container 104 has large shrinkage, the width of the container 104 reduces compared to the container 104 having small shrinkage. Accordingly, when the container 104 is disposed in the inclined slide rail 105 attached to the cover 107, the attachment position of the container 104 (having large shrinkage) relative to the slide rail 105 displaces downwardly under a predetermined position.

As a result, an upper space between the container 104 and the cover 107 or an instrument panel (finisher) to which the cover 107 is attached increases, which deteriorates appearance. On the other hand, when the container 104 has small shrinkage, the upper space decreases. More specifically, the upper space between the container 104 and the instrument panel (finisher) significantly varies depending on the shrinkage amount of the container 104.

In CN104044515B, with respect to such a problem, a separated bracket 165 is disposed between the external surface of the slide rail 105 and the bottom surface 112 of the cover 107. The bracket 165 and the cover 107 are fastened by a bolt 139 in a position according to the width after the shrinkage of the container 104. With this configuration, the container 104 is controlled from being varied in height and the tolerance of the container 104 in the width direction Y is adjusted to fix the both.

SUMMARY

However, the configuration of CN104044515B has the following problem. In CN104044515B, the bottom surface 112 of the cover 107 and the bracket 165 are fastened through the bolt 139 upwardly from the underneath, which deteriorates the workability and the productivity.

It is therefore the present disclosure has been made in view of the above problem.

To solve the above problem, the present disclosure provides a drawer-type storage box mounted on a vehicle. The drawer-type storage box includes a box-shaped resin container having on a top thereof an opening portion, a slide rail that extends in a drawing direction of the container and inclines relative to a width direction of the container, a bracket that connects the slide rail to the container, and a cover that stores the container and to which the slide rail is directly or indirectly attached. The container has a contact surface that contacts the bracket and the contact surface is substantially parallel to the width direction of the container. A fastening member mounted from the opening portion side of the container fastens the container and the bracket by the contact surface. The container is movable in the width direction relative to the bracket by loosening a fastening force of the fastening member.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, embodiments will be described in details with reference to the drawings. FIGS. 1 to 12 describe the embodiments.

First Embodiment

Hereinafter, configurations of the embodiments will be described.

Figure 1:
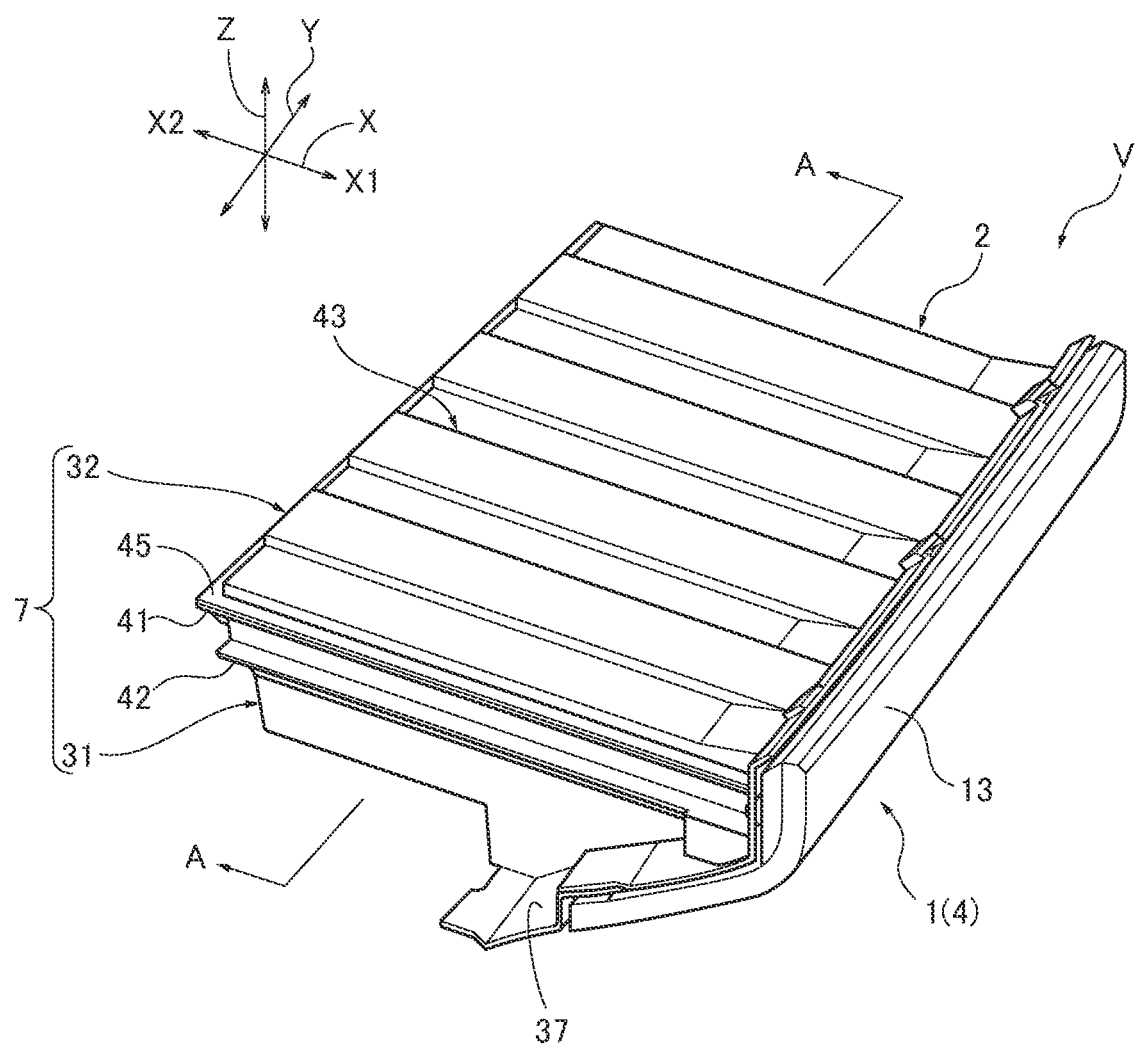
FIG. 1 is an overall perspective view of a drawer-type storage box according to a first embodiment.
Figure 2:
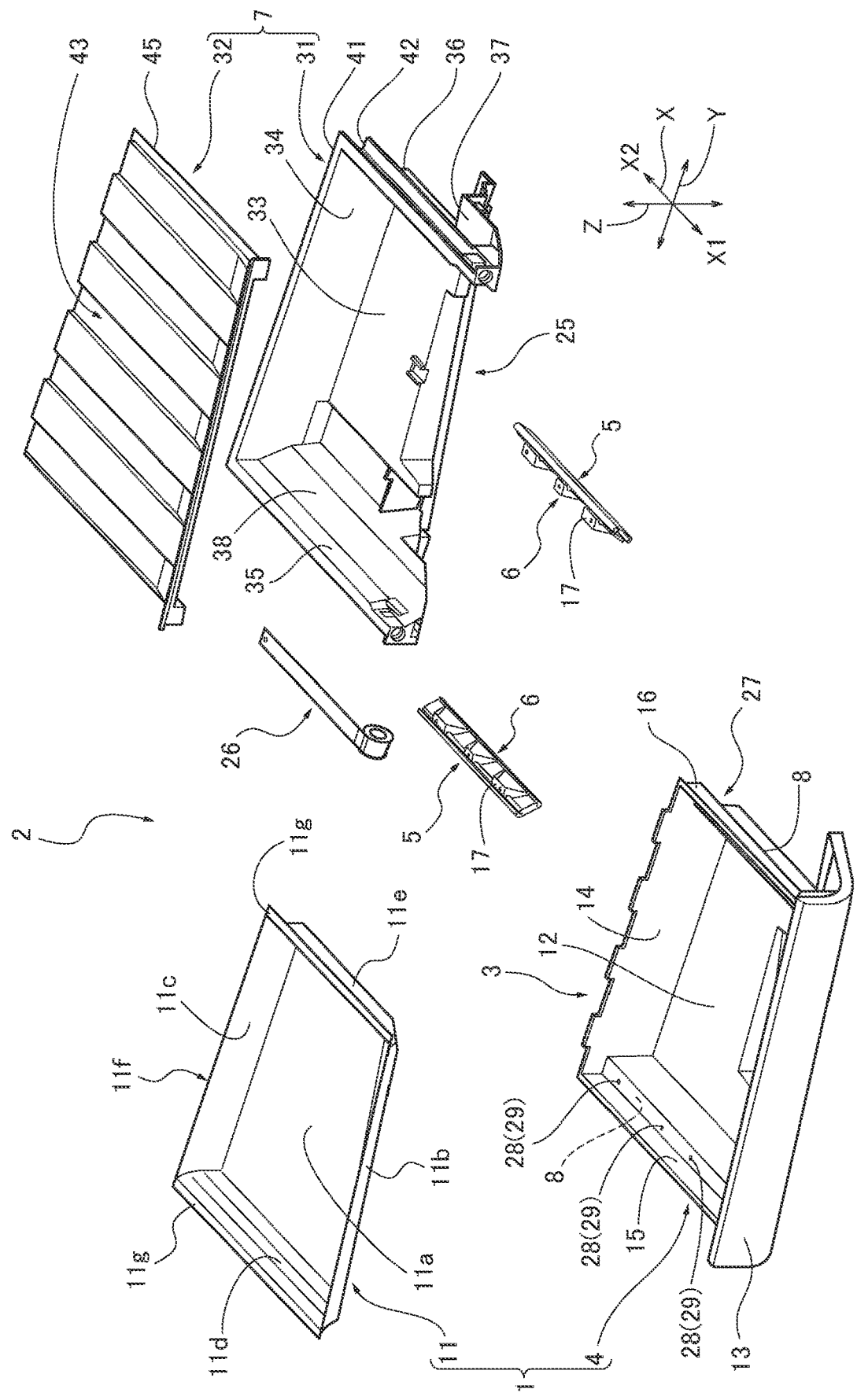
FIG. 2 is an exploded perspective view of the drawer-type storage box of FIG. 1.

The overall perspective view of FIG. 1 and the exploded perspective view of FIG. 2 show a drawer-type storage box 2 which is mounted on a vehicle V such as an automobile.

Herein, the vehicle V is meant to be a vehicle provided with a wheel or a vehicle having a vehicle interior. The drawer-type storage box 2 which is mounted on the vehicle V is meant to be a drawer-type storage box for a vehicle.

The drawer-type storage box 2 is a storage box including a drawer-type storage portion 1. For example, the drawer-type storage box 2 is provided as a glove box in a front passenger set side portion of an instrument panel provided in a front portion of a vehicle interior in the vehicle V. The drawer-type storage box 2 has advantages which can be easily provided in a limited narrow portion of a front surface of the instrument panel and can relatively easily secure a predetermined storage amount by using a free space in a back portion of the instrument panel.

The drawer-type storage box 2 has, in a correct position, a depth direction as a front-back direction X, a right left direction as a width direction Y, and a height direction as a vertical direction Z. The drawer-type storage box 2 is preferably mounted on the vehicle V such that the front-back direction X is substantially aligned with a vehicle front-back direction, the width direction Y is substantially aligned with a vehicle width direction (right left direction to traveling direction of vehicle V), and the vertical direction Z is substantially aligned with the vertical direction of the vehicle V. The front-back direction X and the width direction Y are substantially horizontal, and the vertical direction Z is substantially vertical.

A direction that draws the storage portion 1 from the back side to the front side is a drawing direction X1 of the storage portion 1 and a direction that pushes the storage portion 1 from the front side to the back side is a storage direction X2 of the storage portion 1. The drawing direction X1 and the storage direction X2 are directions along the front-back direction X of the drawer-type storage box 2. It is preferable for the drawing direction X1 and the storage direction X2 to be horizontal, but may be slightly inclined (forward inclination or backward inclination). In addition, the back side of the drawer-type storage box 2 corresponds to the front side of the vehicle V and the front side of the drawer-type storage box 2 corresponds to the back side of the vehicle V.

Figure 3:
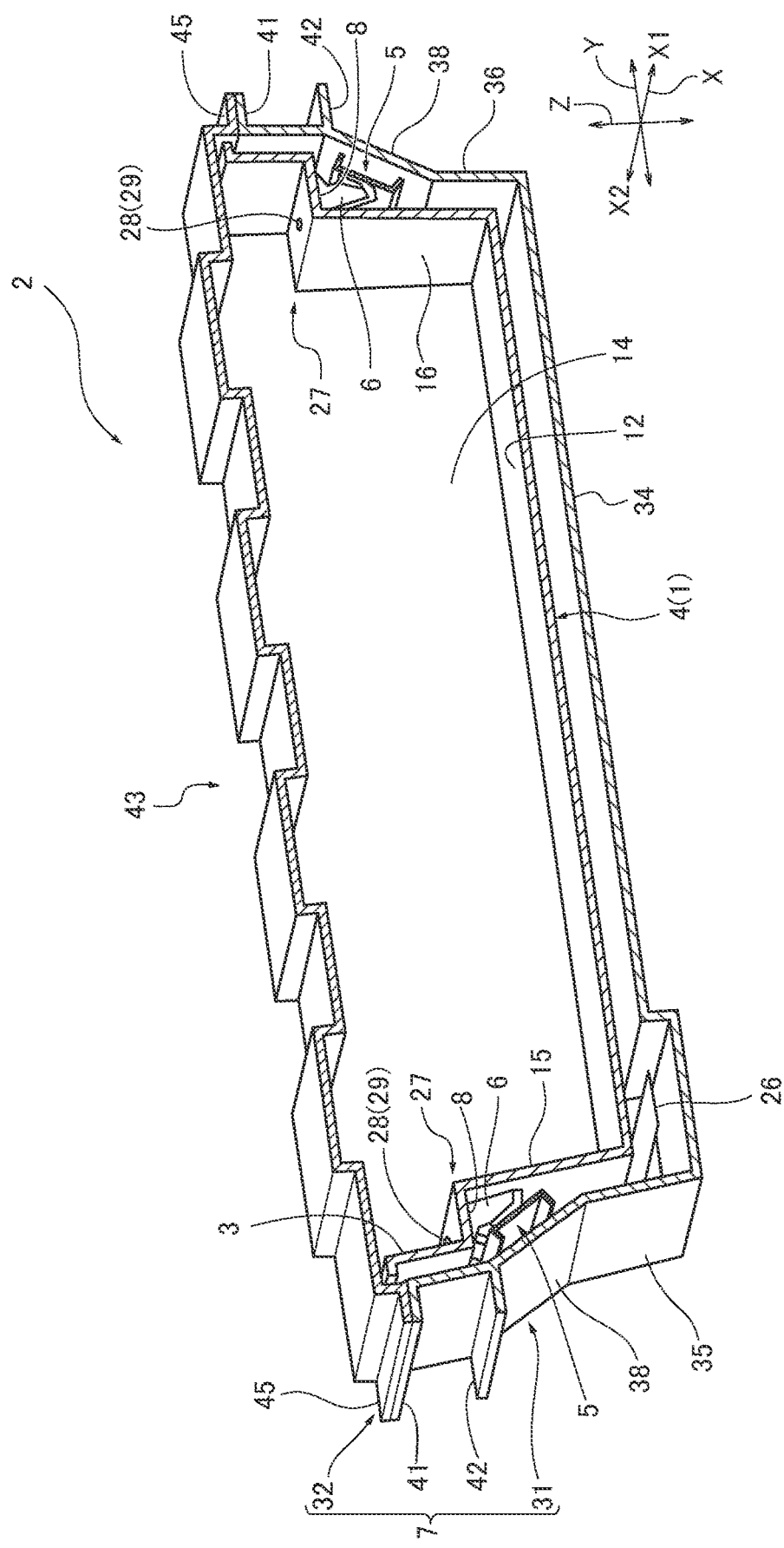
FIG. 3 is a perspective view (without tray) illustrating a longitudinal section of a back portion of the drawer-type storage box of FIG. 1.
Figure 4:
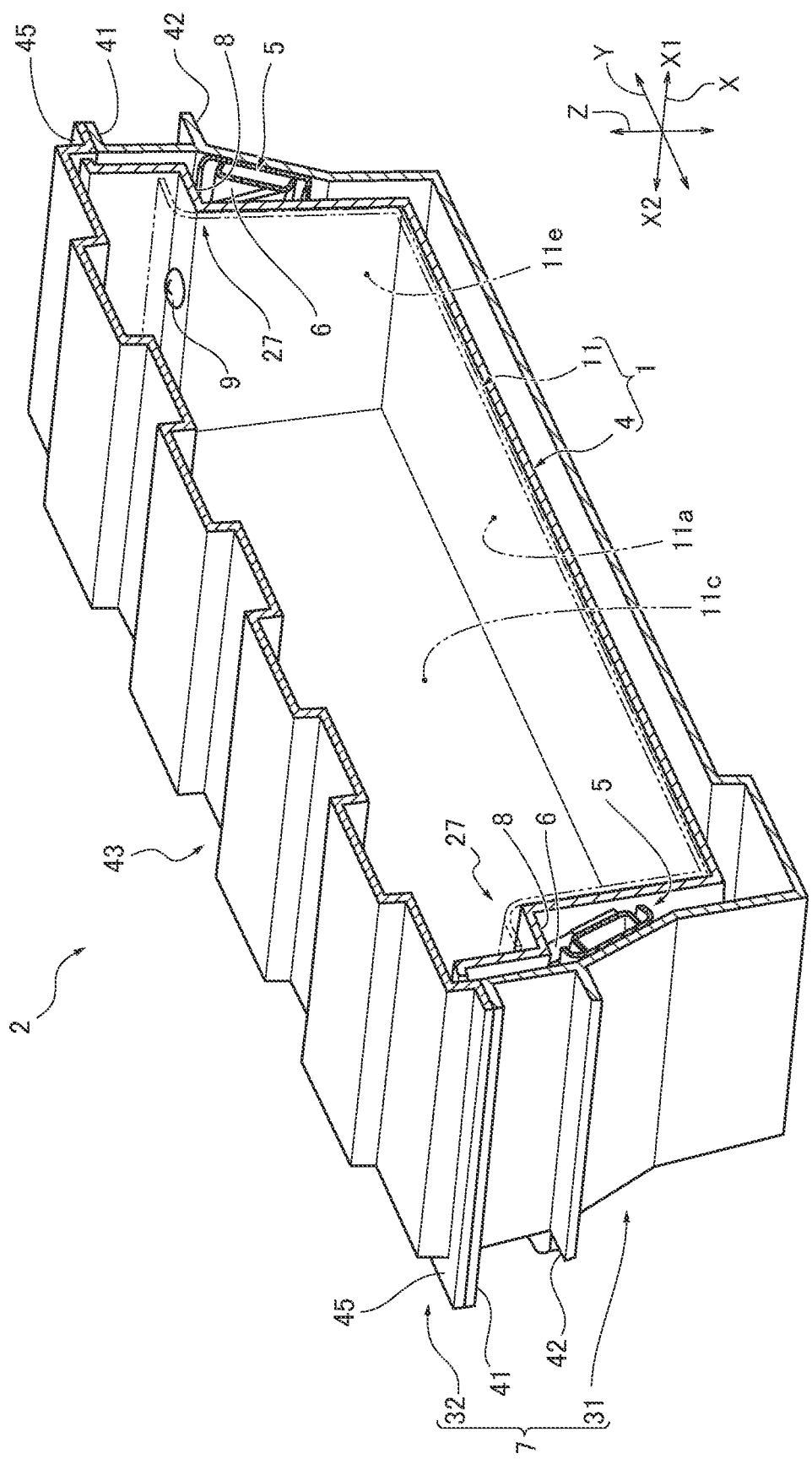
FIG. 4 is a perspective view (with tray) illustrating a longitudinal section of the back portion of the drawer-type storage box of FIG. 1 along an A-A line.
Figure 5:
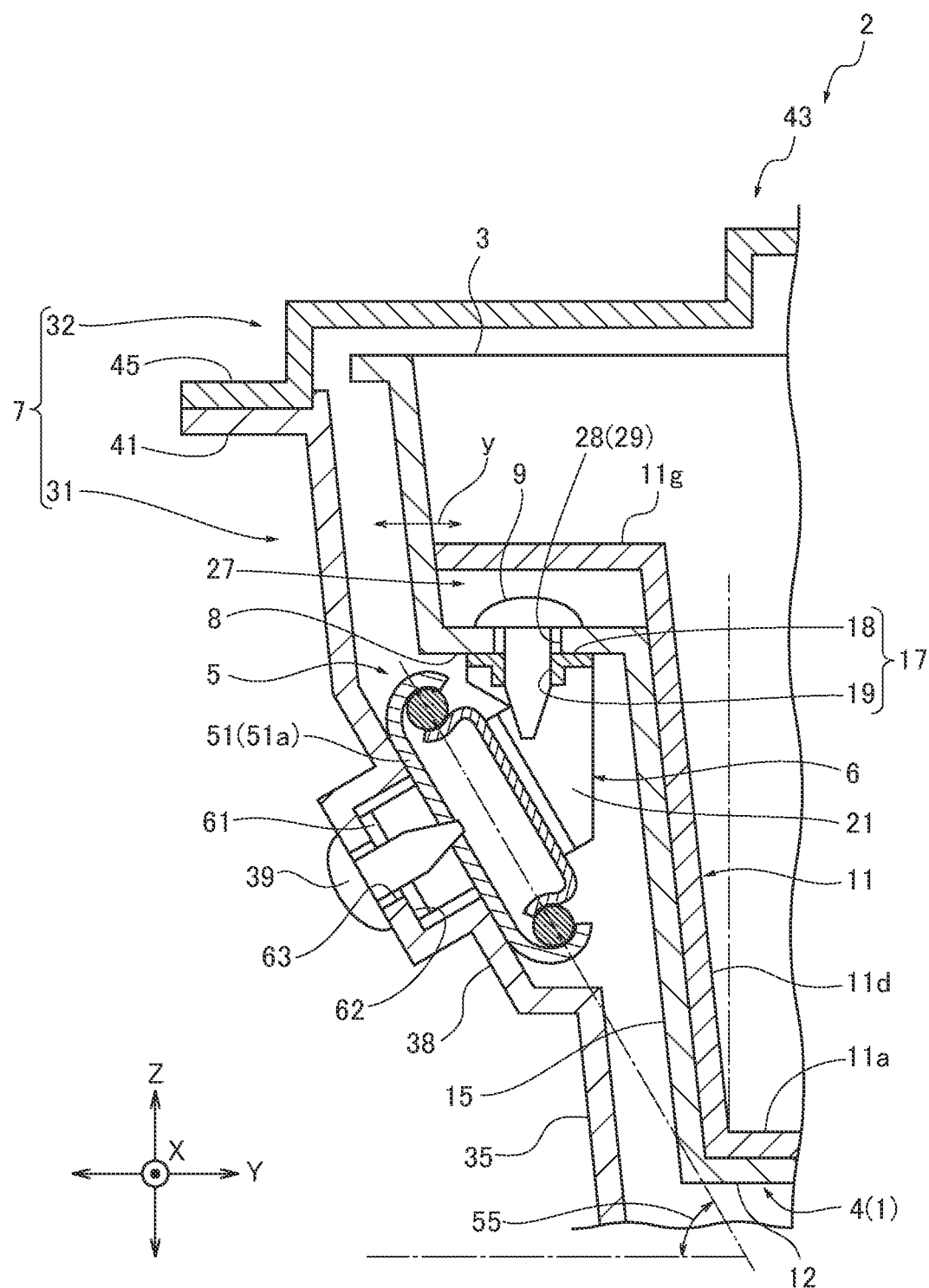
FIG. 5 is a longitudinal sectional view of a left portion of the drawer-type storage portion of FIG. 1.

As illustrated in FIG. 3 (FIG. 4), the drawer-type storage box 2 includes a box container 4 formed of resin having on the top thereof an opening portion 3, a slide rail 5 that extends in the drawing direction X1 of the container 4, and is inclined relative to the width direction Y of the container 4, a bracket 6 that connects the slide rail to the container 4, and a cover 7 that houses the container 4 and to which the slide rail 5 is directly or indirectly attached. The container 4 includes a contact surface 8 that contacts the bracket 6. The contact surface 8 is substantially parallel to the width direction Y of the container 4. As illustrated in FIG. 5, a fastening member 9 mounted from the opening portion 3 side of the container 4 fastens the container 4 and the bracket 6 via the contact surface 8. The container 4 is movable in the width direction Y relative to the bracket 6 by loosening the fastening force of the fastening member 9.

Herein, the container 4 is a resin component (storage box) constituting at least a part (main portion) of the storage portion 1 (drawer) of the drawer-type storage portion 1. The storage portion 1 may include a tray 11 (FIG. 2) that is disposed inside the container 4. The container 4 and the tray 11 may be made of a resin material such as a PPC material, a PC-ABS material, or a PP-GF material. It is preferable for the thickness of each portion of the resin component such as the container 4, the tray 11, and the cover 7 to be substantially equal except an exceptional portion, so as to avoid a sink mark when forming.

As illustrated in FIG. 2, the container 4 includes a bottom surface 12 and side surfaces 13 to 16 rising upwardly from the respective sides of the bottom surface12, and is a flat container having on the top thereof the opening portion 3. The bottom surface 12 has, in a planer view, an approximate square shape having four sides (first to fourth sides) and four corners (first to fourth corners), and is disposed to be substantially horizontal relative to the front-back direction X and the width direction Y.

The side surfaces 13 to 16 of the container 4 are made by front, back, left, and right four surfaces. The side surface 13 (front surface) of these four surfaces is a design face constituting a part of the front surface of the instrument panel, and differs from other side surfaces 14 to 16 in a shape. In this embodiment, the side surface 13 has an upper side as a longitudinal surface extending in the vertical direction Z, and a lower side as an inclined surface lowered at the depth as seen from the side (width direction Y), and the side surface 13 has a periphery (expanded portion) expanding in the width direction Y and the vertical direction Z.

The side surface 14 (back surface) substantially extends in the width direction Y, and the left and right side surfaces 15, 16 are substantially orthogonal to the side surface 14, and extend substantially parallel to each other along the front-back direction X. In this embodiment, the left and right side surface 15, 16 have different lengths to each other, and the side surface 13 and the side surface 14 are nonparallel to each other. However, the left and right side surfaces 15, 16 may have the same length, and may be parallel to each other. The side surface 14 and the left and right side surfaces 15, 16 have the approximate same height. At least upper edge portions of the left and right side surfaces 15, 16 may be provided with a flange extending outwardly in the width direction Y according to needs. In this embodiment, the left and right side surfaces 15, 16 are outwardly expanding inclined surfaces expanding outwardly in the width direction Y toward the upper side (FIG. 5). The inclination angle may be set to an angle equal to a punched taper or more, for example, about 6° relative to the vertical direction Z (84° relative to width direction Y).

When the container 4 is set inside the cover 7, the bottom surface 12 of the container 4 may be separated from a bottom surface 33 of the cover 7 to have a space therebetween. The left and right side surfaces 15, 16 of the container 4 may be separated from side surfaces 35, 36 of the cover 7 to be located inside in the width direction Y with intervals (FIG. 5).

As illustrated in FIG. 2, the tray 11 is a receiver that is disposed inside the container 4, and has a size slightly smaller than that of the container 4, so as to be housed inside the container 4. The tray 11 is a flat container having on the top thereof an opening portion 11f. The tray 11 includes a bottom surface 11a and sides surfaces 11b to 11e rising upwardly from respective sides of the bottom surface 11a. The bottom surface 11a has, in a planer view, an approximate square shape including four sides (first to forth sides) and four corners (first to fourth corners). The bottom surface 11a has a shape substantially similar to that of the bottom surface 12 of the container 4, and has a size slightly smaller than that of the bottom surface 12 of the container 4.

The side surfaces 11b to 11e of the tray 11 include front, back, left, and right four surfaces. The side surface 11b (front surface) of these surfaces substantially extends in the width direction Y along the front surface of the instrument panel. The side surface 11c (back surface) substantially extends in the width direction Y. The left and right side surfaces 11d, 11e are substantially orthogonal to the side surface 11c, and extend substantially parallel to each other along the front-back direction X. In this embodiment, the left and right side surfaces 11d, 11e have different lengths to each other, and the side surface 11b and the side surface 11c are nonparallel to each other. However, the left and right side surfaces 11d, 11e may have the same length, and the side surface 11d and the side surface 11c may be parallel to each other according to the shape of the container 4. The respective side surfaces 11b to 11e have the approximate same height. The upper edge portion of each side surface 11b to 11e may be provided with a flange 11g extending outwardly in the width direction Y according to needs. In addition, at least left and right side surfaces 11d, 11e may be provided with an externally expanded inclination expanding outwardly in the width direction Y toward the upper side (FIG. 5). It is preferable for the inclination of the left and right side surfaces 11d, 11e of the tray 11 to have the approximate same angle as the inclination of the left and right side surfaces 15, 16 of the container 4.

When the tray 11 is set inside the container 4, the bottom surface 11a of the tray 11 may contact the bottom surface 12 of the container 4. In this case, at least left and right side surfaces 11d, 11e of the tray 11 may contact at least the inner surfaces of the lower portions of the right and left side surfaces 15, 16 of the container 4 (FIG. 5).

Figure 6A:
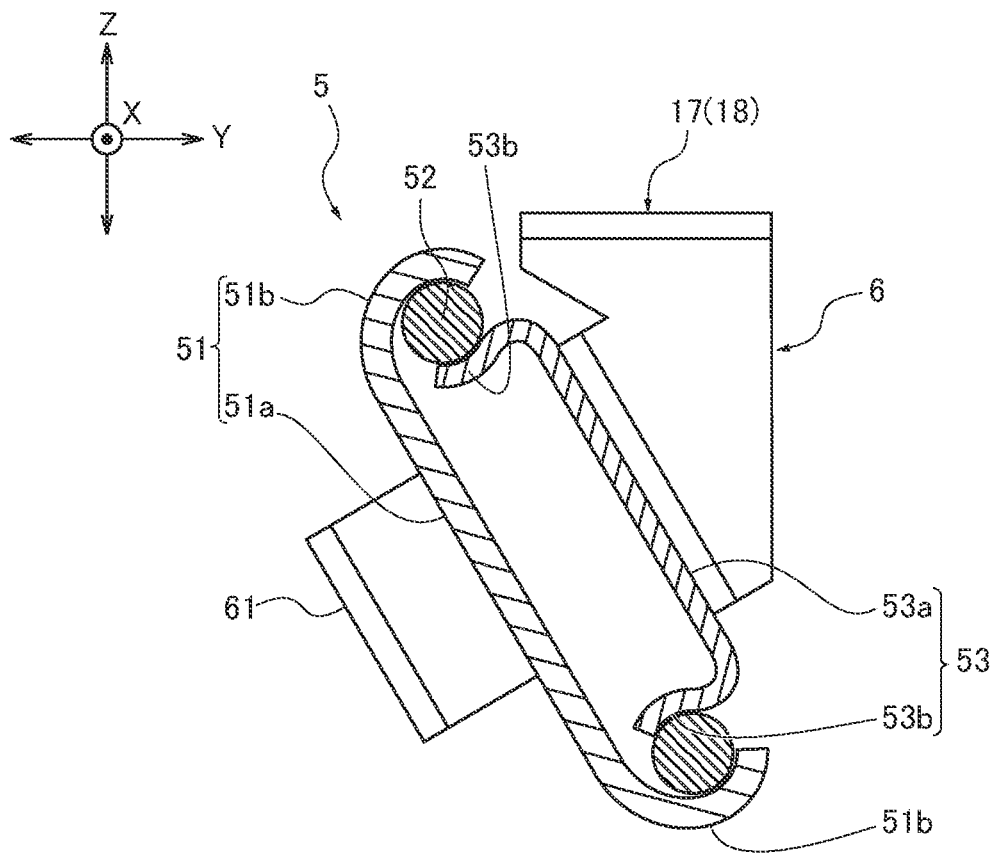
FIG. 6A is a longitudinal sectional view of a slide rail and a bracket as seen from a front.
Figure 6B:
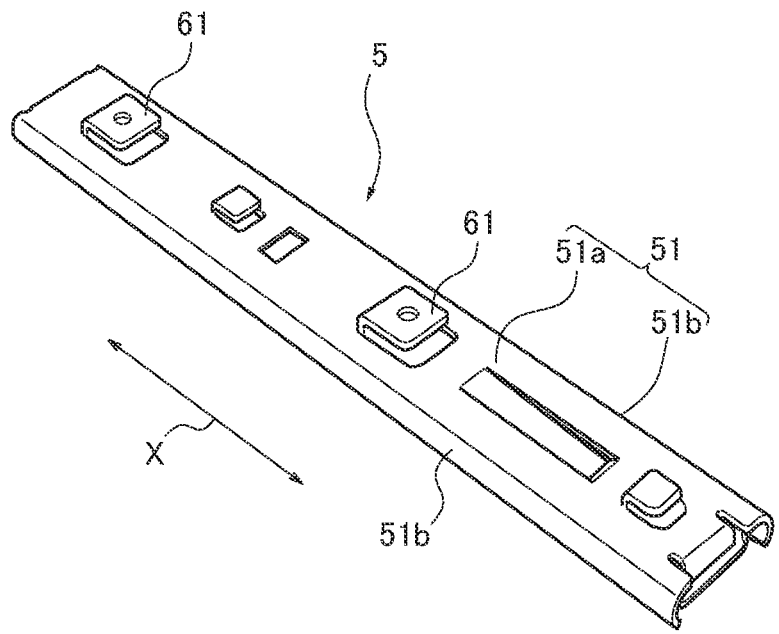
FIG. 6B is an overall perspective view of the slide rail as seen from an outer rail side.

The slide rail 5 as illustrated in FIG. 6A (FIG. 6B) is a metal guide member that is disposed between the cover 7 and the container 4 to extend along the front-back direction X (FIG. 5), and guides the movement of the container 4 relative to the cover 7 in the drawing direction X1 and the storage direction X2. The slide rail 5 is disposed in a space between the outsides of the left and right side surfaces 15, 16 of the container 4 and the insides of the side surfaces of the cover 7. A pair of the slide rails 5 is provided in both sides of the drawer-type storage box 2, respectively, in the width direction Y (FIG. 2).

As illustrated in FIG. 5, the slide rail 5 is arranged to be inclined (inclination arrangement) at a middle angle of the vertical posture and the horizontal posture. This inclination is appropriately set in the range of 10° to 80° relative to the width direction Y. In this embodiment, the inclination is set to 60°. As described above, by arranging the slide rail 5 to be inclined, the slide rail 5 has a stiffness relative to the loads from the above and the side. In addition, the vertical posture is meant that the width direction of the slide rail 5 is aligned with the vertical direction Z of the drawer-type storage box 2, and the horizontal posture is meant that the width direction of the slide rail 5 is aligned with the vertical direction Z and the width direction Y of the drawer-type storage box 2. The inclination arrangement is meant that the width direction of the slide rail 5 is arranged to be inclined relative to both of the vertical direction Z and the width direction Y of the drawer-type storage box 2. With this inclination, the slide rail 5 has the upper portion located outside and the lower portion located inside relative to the width direction Y of the drawer-type storage box 2 as seen from the front-back direction X. The detail of the slide rail 5 will be described later.

A bracket 6 is a mounting bracket for mounting the slide rail 5 on the container 4. The bracket 6 is disposed inside each inclined slide rail 5 in the width direction Y. A pair of the brackets 6 is provided in both right and left sides of the drawer-type storage box 2 in the width direction Y (FIG. 2). As each bracket 6 is disposed inside the slide rail 5 upwardly, each bracket 6 may be referred to as an upper bracket (or first bracket).

Figure 7:
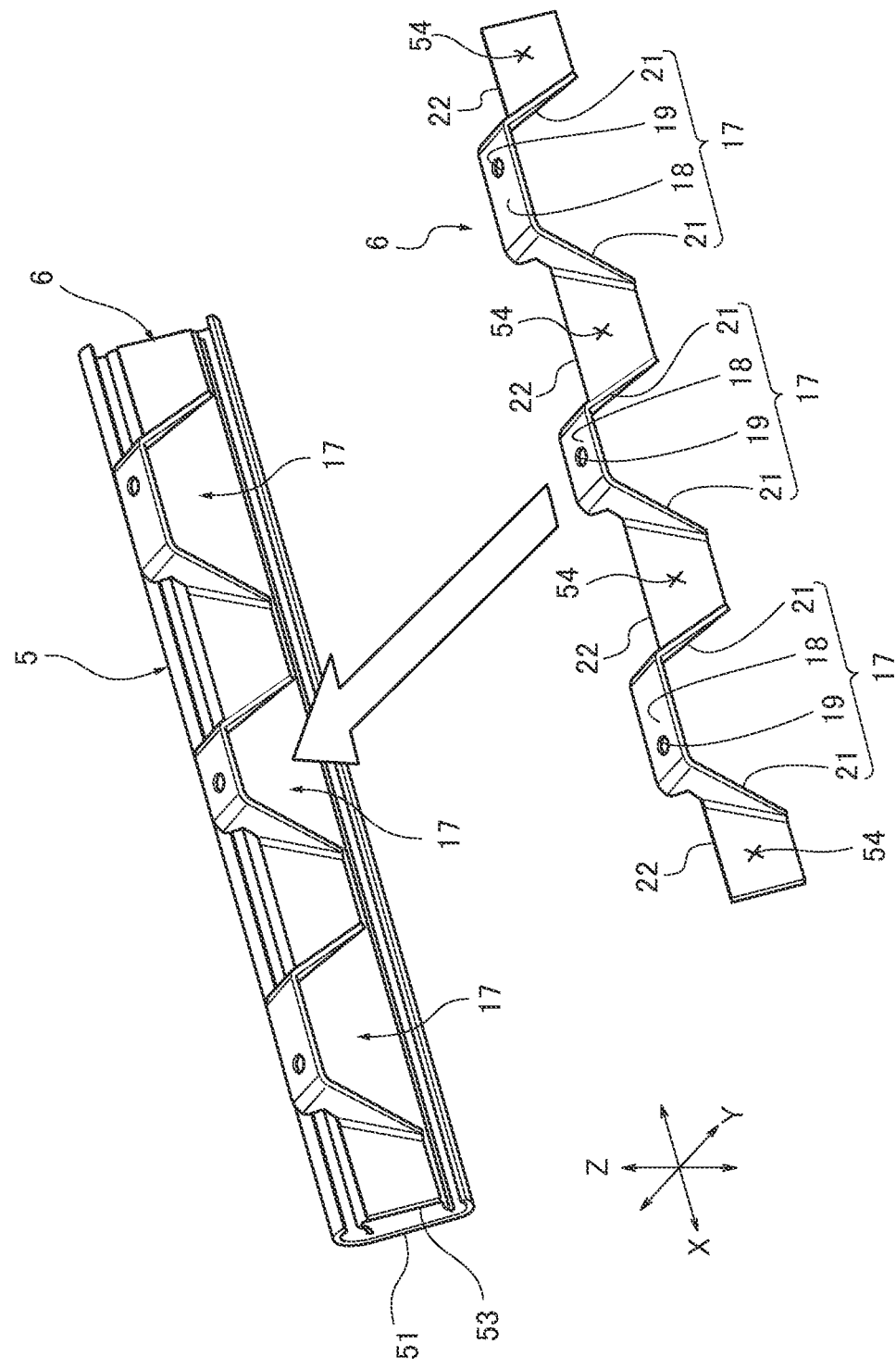
FIG. 7 is an exploded perspective view illustrating the attachment of the bracket attached to the slide rail.

As illustrated in FIG. 7, the bracket 6 is provided with a receiving portion 17 that receives the contact surface 8 from the below and a rail contact portion 22 that contacts an inner rail 53 of the slide rail 5, and connects the inner rail 53 and the receiving portion 17. The bracket 6 is formed by bending one metal plate to have a convex-concave shape. A mountain portion of the convex-concave shape is the receiving portion 17 and a valley portion of the convex-concave shape is the rail contact portion 22. In addition, the shape of the bracket 6 is not limited to the convex-concave shape. In the sectional view of FIGS. 5, 8, the bracket 6 may have a shape (V sectional shape) in which a bent part between a receiving surface 18 and the rail contact portion 22 is uniformly and successively provided in the direction orthogonal to the figure. The bending rigidity of the bracket 6 can be improved with this shape.

The receiving portion 17 includes the receiving surface 18 that contacts the contact surface 8. The receiving surface 18 includes an attachment hole 19 as a screw hole to which the fastening member 9 is screwed. The receiving portion 17 includes on both sides of the receiving surface 18 (in front-back direction X) a leg portion 21 substantially extending in the vertical direction Z toward the slide rail 5. The both leg portions 21 of the receiving surface 18 have a tapered shape narrowed upwardly or a tapered shape expanded downwardly as seen the slide rail 5 from the width direction Y.

By fastening the contact surface 8 and the receiving surface 18 with the fastening member 9, the fastening member 9 is used as a stop point (or attachment point) between the container 4 and the slide rail 5. A plurality of stop points (for example, three points such as front, back, and middle) are provided between the contact surface 8 and the receiving surface 18 with intervals in the front-back direction X. A plurality of receiving surfaces 18 are thus provided in the bracket 6 in accordance with the number of stop points.

In the present embodiment, a plurality of receiving portions 17 are connected by the rail contact portions 22 to be integrated, and are attached to the approximate entire range of the slide rail 5 at once. However, a plurality of receiving portion 17 may be separately provided to be independently and partially attached to the slide rail 5. It is preferable for the left and right brackets 6 to be formed such that a plurality of receiving portions 17 are in the same positions in the front-back direction X on the right and left. Both ends of the bracket 6 (in front-back direction X) in which a plurality of receiving portions 17 are connected by the rail contact portions 22 may be provided with rail contact portions 22 extending in the front-back direction X similar to the rail contact portions 22. These rail contact portions 22 contact (surface contact) the slide rail 5.

As illustrated in FIG. 2, the cover 7 is a resin box that has a size larger than that of the container 4 and covers the entire container 4 from the outside. The cover 7 may be made of a resin such as a PPC material, a PC-ABS material, or a PP-GF material. It is preferable for the thickness of each portion of the resin component such as the cover 7 to be substantially equal except an exceptional portion, so as to avoid a sink mark when forming.

The front surface of the cover 7 has an opening portion 25 through which the container 4 is inserted into the cover 7. The periphery of the opening portion 25 may be appropriately provided with a flange for reinforcement. For example, a biasing member 26 that biases the container 4 to the cover 7 in the storage direction X2 may be provided between the cover 7 and the container 4. The container 4 drawn in the drawing direction X1 automatically returns in the storage direction X2 by the biasing member 26 when the container 4 is released from the drawing force. The biasing member 26 may be a constant load spring, for example. The bottom of the container 4 may be provided with a concave portion in which the biasing member 26 is disposed. The concave portion extends in the front-back direction X. The cover 7 will be described later.

As illustrated in FIG. 5, the contact surface 8 is a surface (attachment surface) to which the stop point of the container 4 to the bracket 6 is provided. The contact surface 8 is provided above the bracket 6, and contacts the receiving portion 17 (receiving surface 18) of the bracket 6. The contact surface 8 is provided in each of the left and right side surfaces 15, 16 of the container 4. The contact surfaces 8 may be independently provided in the positions corresponding to the receiving portions 17 of the bracket 6 with the same number as the receiving portions 17 relative to the front-back direction X. However, the contact surface 8 may be formed to extend over the approximate entire ranges of the left and right side surfaces 15, 16 of the container 4 in the front-back direction X, so that the contact surfaces 8 may be provided in the left and right side surfaces 15, 16, respectively.

In this embodiment, the contact surface 8 is formed as a level difference surface (lower surface) expanding outside an outer level difference portion 27 in the width direction Y. The outer level difference portion 27 offsets each of the upper portions of the left and right side surfaces 15, 16 of the container 4 to expand outwardly in the width direction Y relative to the lower portions. The level different surface of the outer level difference portion 27 is provided in a position in the width direction Y, which overlaps with the bracket 6 in the vertical direction, and has a width that is substantially the same as that of the bracket 6 (receiving surface 18) or wider than that. In this embodiment, the level difference surface of the outer level difference portion 27 may be provided in the middle position of the left and right side surfaces 15, 16 of the container 4 in the vertical direction Z. However, the position of the level difference surface of the outer level difference portion 27 is not limited to the above.

The contact surface 8 has an attachment hole portion 28 through which the fastening member 9 is attached. The attachment hole portion 28 is provided to be aligned with the attachment hole 19 of the receiving portion 17. In addition, in the left and right side surfaces 15, 16 of the container 4, the upper portions and the lower portions of the outer level difference portions 27 have the approximate same inclination angles. The flange 11g of the upper end portion of the tray 11 may be provided at a height slightly higher than that of the level difference surface (contact surface 8) of the outer level difference portion 27 to cover the fastening member 9 from the above. In this case, the flange 11g has a length that reaches the inner surface of the upper portion of the outer level difference portion 27 in the left and right side surfaces 15, 16 of the container 4.

The contact surface 8 has each portion in the front-back direction X to be parallel to the width direction Y of the container 4 when the container 4 is horizontally disposed. In this case, the left and right contact surfaces 8 provided in the left and right side surfaces 15, 16 of the container 4 have the portions in the same positions in the front-back direction X to have the approximate same height. A line connecting in the width direction Y the same positions of the left and right contact surfaces 8 in the front-back direction X is horizontal to be parallel to the portion of the bottom surface 12 of the container 4 in the same position in the front-back direction X relative to the width direction Y.

The fastening member 9 may be a screw including a body part having on an outer circumference thereof a thread and a head part provided in an end portion of the body part to have a diameter larger than that of the body part. The fastening member 9 such as a screw is attached to the contact surface 8 downwardly from above the contact surface 8 when the body part is aligned with the vertical direction Z.

In order to move the contact surface 8 of the container 4 relative to the bracket 6 in the width direction Y by loosening the fastening force of the fastening member 9, a position adjustment portion 29 relative to the width direction Y is provided between the contact surface 8 and the bracket 6. The position adjustment portion 29 is the attachment hole portion 28 through which the fastening member 9 provided in the contact surface 8 is attached. The attachment hole portion 28 is, for example, a long hole extending in the width direction Y and a round hole having a clearance for position adjustment. When the position adjustment portion 29 is provided in both of the left and right of the container 4, it is preferable for the adjustment amount of the position by each of the position adjustment portion 29 to be a half of the maximum shrinkage or more relative to the width direction Y when forming the container 4. When the position adjustment portion 29 is provided in one of the left and right of the container 4 only, it is preferable for the adjustment amount of the position by the position adjustment portion 29 to be the maximum shrinkage or more relative to the width direction Y when forming the container 4.

(2) The cover 7 may include a lower cover 31 that supports the slide rail 5 and an upper cover 32 that is separated from the lower cover 31, is coupled to the lower cover 31, and covers the opening portion 3 of the container 4.

Herein, as illustrated in FIG. 2, the lower cover 31 is a flat case having on the top thereof an opening portion. The lower cover 31 includes a bottom surface 33 and side surface portions 34 to 36 rising from respective sides except a front side of the bottom surface 33.

The bottom surface 33 has in a planer view an approximate square shape having four sides (first to fourth side portions) and four corners (first to fourth corner portions), and is substantially disposed to be horizontal to the front-back direction X and the width direction Y. The bottom surface 33 has substantially the same shape as that of the bottom surface 12 of the container 4 and has a size slightly larger than that of the bottom surface 12 of the container 4.

The side surface portions 34 to 36 of the lower cover 31 are made of the back surface and the left and right surfaces. The side surface portion 34 (back surface portion) substantially extends in the width direction Y, and the left and right side surface portions 35, 36 are substantially orthogonal to the side surface portion 34, and extend substantially parallel to each other along the front-back direction X. The left and right side surface portions 35, 36 have different lengths to each other. The side surface portions 34 to 36 have substantially the same height. The side surface portions 34 to 36 of the lower cover 31 have substantially the same height as that of the side surfaces 14 to 16, a height slightly higher than that, or a height slightly lower than that.

The front side of the lower cover has an opening portion 25. The periphery of the opening portion 25 may be provided with a flange receiving portion 37 that receives the periphery (expanded portion) of the side surface 13 of the container 4 from the back side. In addition, at least the left and right side surface portions 35, 36 may be provided with outer expanded inclinations that extend outwardly in the width direction Y toward the upper side (FIG. 5). It is preferable for the inclinations of the left and right side surface portions 35, 36 of the lower cover 31 to have substantially the same angle as that of the inclination of the left and right side surfaces 15, 16 of the container 4 or an angle smaller than that.

Each of the left and right side surface portions 35, 36 is provided with a rail attachment portion 38 to which the slide rail 5 is attached. The rail attachment portion 38 has a range that is substantially the same as the width of the slide rail 5 or a range slightly wider than that. The rail attachment portion 38 is provided such that its main part is located under the contact surface 8 of the container 4. The rail attachment portion 38 is provided outside the slide rail 5 in the width direction Y. In this embodiment, the rail attachment portion 38 is an inclination surface having the same angle as the inclination angle 55 of the slide rail 5. The slide rail 5 contacts (surface contact) the inner surface of the slide rail 5. The rail attachment portion 38 extends substantially the entire range of each of the left and right side surface portions 35, 36 in the front-back direction X.

The slide rail 5 is fixed to the inner surface of the rail attachment portion 38 by a fixing member 39 (FIG. 5) such as a screw from an outer surface side of the rail attachment portion 38 in the horizontal direction (direction vertical to width direction of slide rail 5). When the container 4 is completely housed in the cover 7, the fixing position in the front-back direction X by the fixing member 39 is substantially the same as the fastening position by the fastening member 9.

A flange 41 expanding outside the cover 7 in the width direction Y is provided in the upper edge portions of the side surface portions 34 to 36 of the lower cover 31 or the vicinity thereof. The flange 41 is substantially horizontal to the width direction Y. In this embodiment, the flange 41 is located slightly below the upper edge portions of the side surface portions 34 to 36 (about half of thickness of flange 41). The upper cover 32 is attached to the portions of the upper edge portions of the side surface portions 34 to 36, which project above the flange 41.

For example, a reinforcement flange 42 (FIG. 4) expanding outside the cover 7 in the width direction Y may be provided in the upper portion of the rail attachment portion 38 according to needs. The reinforcement flange 42 may be provided in the upper portion of the rail attachment portion 38 slightly below the contact surface 8 to be substantially parallel to the flange 41 and to have substantially the same length as that of the flange 41.

The upper cover 32 is a lid that closes the upper opening portion of the lower cover 31. The upper cover 32 has a height which does not interfere with the upper edge portion of the container 4. A top surface of the upper cover 32 may be provided with a plurality of convex-concave portions 43 in the width direction Y. The convex-concave portions 43 have convex portions and concave portions extending in the front-back direction X. The convex-concave portion 43 improves the strength of the upper cover 32. In addition, the upper edge portion of the side surface 14 of the container 4 may have a convex-concave shape (FIG. 2) in accordance with the convex-concave portion 43 of the upper cover 32.

The periphery of each side of the upper cover 32 except the front side of the upper cover 32 is provided with a flange 45 that contacts the flange 41 provided in the upper edge portions of the side surface portions 34 to 36 of the lower cover 31 from the above. The flange 41 of the lower cover 31 and the flange 45 of the upper cover 32 contact to each other to be fixed by a crip, a claw, or a screw, for example.

In addition, an auxiliary hole may be provided in the upper portion of the cover 7 just above the fastening member 9 to perform the fastening operation with the fastening member 9 through the auxiliary hole without dividing the cover 7 into the lower cover 31 and the upper cover 32. The auxiliary hole has a size with which a tool such as a screwdriver can be inserted into the auxiliary hole or more.

(3) As illustrated in FIG. 5, the side surfaces 15, 16 of the container 4 have a level different shape including the contact surface 8 and the inclination surface inclined to the contact surface 8. The angle of the inclination surface relative to the width direction Y is larger than the angle of the slide rail 5 relative to the width direction Y.

(4) As illustrated in FIG. 6A (6B), the slide rail 5 may include an outer rail 51 directly or indirectly fixed to the cover 7 and an inner rail 53 mounted inside the outer rail 51 through a ball 52. The bracket 6 may be welded to the inner rail 53 (welded portion 54 in FIG. 7).

Herein, the outer rail 51 is a metal guide provided outside in the slide rail 5. The outer rail 51 includes a flat back surface 51a and upper and lower edge portions 51b provided in both sides of the back surface 51a in the width direction, and has an approximate C shape section in which the upper and lower edge portions 51b bend inwardly (toward inner rail 53). The outer rail 51 extends in the front-back direction X. The outer rail 51 is a fixed rail that is directed toward the cover 7 to be fixed thereto.

The ball 52 is a metal sphere rolling member disposed between the outer rail 51 and the inner rail 53. The ball 52 is held in a holder (not shown) to be disposed between the outer rail 51 and the inner rail 53.

The inner rail 53 is a metal guide body provided inside in the slide rail 5. The inner rail 53 includes a flat back surface 53a and up and down edge portions 53b provided both sides of the back surface 53a in the width direction. The inner rail 53 has an approximate C shape section in which the upper and lower edge portions 53b bend outwardly (toward outer rail 51). The inner rail 53 extends in the front-back direction X. The inner rail 53 is a movable rail that is directed toward the container 4 to be fixed thereto through the bracket 6.

The back surface 53a of the inner rail 53 has a width narrower than that of the back surface 51a of the outer rail 51. The outer rail 51 and the inner rail 53 face to each other to insert the upper and lower edge portions 53b of the inner rail 53 into the upper and lower edge portions 51b of the outer rail 51, so that the outer rail 51 and the inner rail 53 are combined as the slide rail 5.

The ball 52 is provided between the upper and lower edge portions 51b of the outer rail 51 and the upper and lower edge portions 53b of the inner rail 53. The upper and lower edge portions 51b of the outer rail 51 are provided with curved portions, respectively, corresponding to the outer shape of the ball 52 and the upper and lower edge portions 53b of the inner rail 53 are also provided with curved portions, respectively, corresponding to the outer shape of the ball 52. The upper and lower portions of the ball 52 are enclosed between the curved portions provided in the upper and lower edge portions 51b of the outer rail 51 and the upper and lower edge portions 53b of the inner rail 53, and rolls along the cured portions.

The back surface 51a of the outer rail 51 and the back surface 53a of the inner rail 53 are disposed to be substantially parallel to each other. With the inclination of the slide rail 5, the back surface 51a of the outer rail 51 and the back surface 53a of the inner rail 53 are inclined outside the drawer-type storage box 2 in the width direction Y toward the upper side. The inclination angle 55 (FIG. 5) of the back surface 51a of the outer rail 51 and the back surface 53a of the inner rail 53 may be freely set within the range of 10° to 80° upwardly with the horizontal direction as a standard. However, it is preferable for the inclination angle 55 to be 45° or more (80° or below), for example, 60°, so as to dispose the slide rail 5 to be close to the vertical posture.

The welding between the bracket 6 and the inner rail 53 is, for example, spot welding. The spot welding may be performed to a plurality of positions (for example, four positions including position of rail contact portion 22 between receiving portions 17 and position of rail contact portion 22 outside receiving portion 17) except the receiving portion 17 of the bracket 6 (welded portion 54 in FIG. 7). The rail contact portion 53 is thereby used as a fixing portion to the slide rail 5. The bracket 6 is welded to the inner rail 53 only. The bracket 6 may be attached to the inner rail 53 with a screw or a clamp. However, it is preferable for the bracket 6 to be welded to the inner rail 53 as described above.

Figure 8:
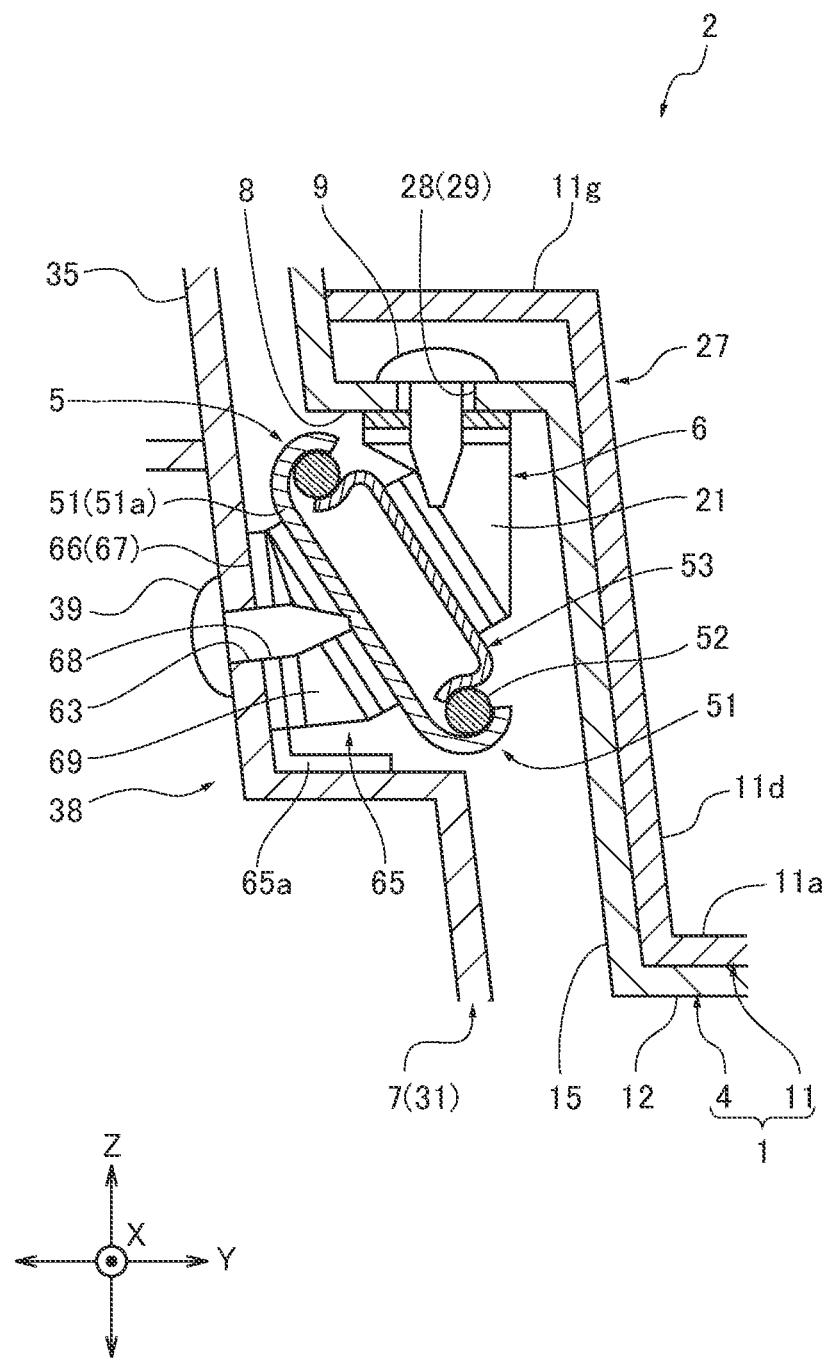
FIG. 8 is a longitudinal sectional view of a left portion of a drawer-type storage box according to a second embodiment similar to FIG. 5.

(5) As illustrated in the embodiment of FIG. 5 or FIG. 8, the slide rail 5 may be fastened to the inner surface of the cover 7 (direct fastening (FIG. 5), indirect fastening (FIG. 8)).

Herein, the inner surface of the cover 7 is an inside surface of each of the left and right side surface portions 35, 36 of the lower cover 31 in the width direction Y. The slide rail 5 is attached to the inside of the rail attachment portion 38 formed in the left and right side surface portions 35, 36 of the lower cover 31 with the fixing member 39 such as a screw from outside the cover 7 in the approximate horizontal direction. The fixing member 39 is substantially similar to the fastening member 9.

As illustrated in the first embodiment of FIG. 5, when the slide rail 5 is directly attached to the inner surface (rail attachment portion 38) of the cover 7, the back surface 51a of the outer rail 51 contacts the inner surface of the cover 7, and the back surface 51 of the outer rail 51 is directly fixed (screwed) to the inner surface of the cover 7 by the fixing member 39. In this embodiment, a rising piece 61 (FIG. 6B) rising outwardly is provided in the back surface 51a of the outer rail 51, and a screw hole is provided in the rising piece 61. The fixing member 39 is fixed (screwed) to the rail attachment portion 38 from the outside. In this case, the rail attachment portion 38 is provided with a concave portion 62 that houses the rising piece 61. The concave portion 62 is provided in accordance with the position of the rising piece 61.

Through the attachment of the slide rail 5 when the slide rail 5 contacts the inner surface of the cover 7, the sliding direction of the slide rail 5 (drawing direction X1 and storage direction X2) is accurately aligned with the front-back direction X of the cover 7 (drawer-type storage box 2) as seen from the above (namely, slide rail 5 is accurately positioned along front-back direction X of drawer-type storage box 2 by inner surface of cover 7).

Figure 9:
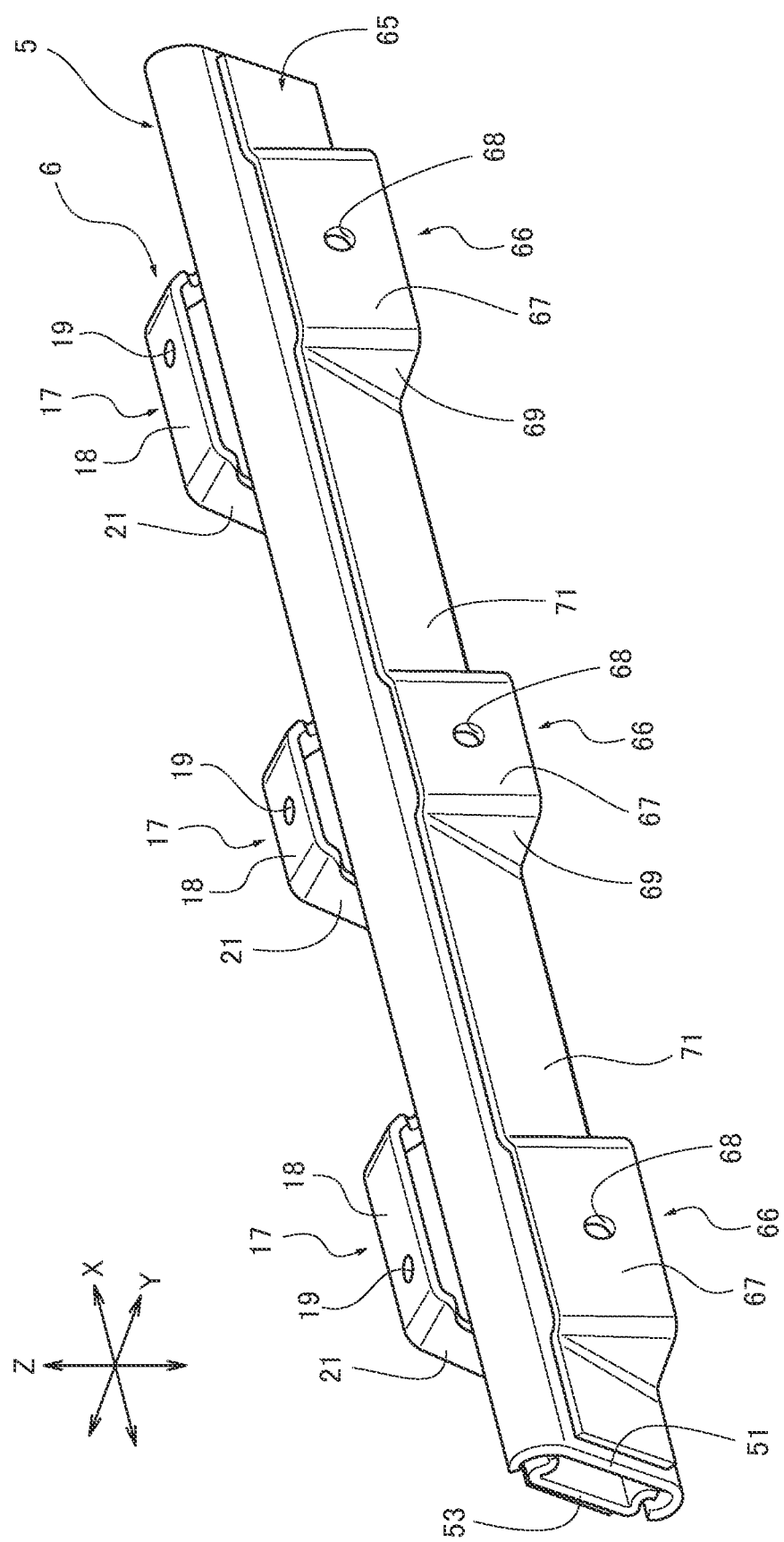
FIG. 9 is an overall perspective view of the slide rail of FIG. 8.
Figure 10:
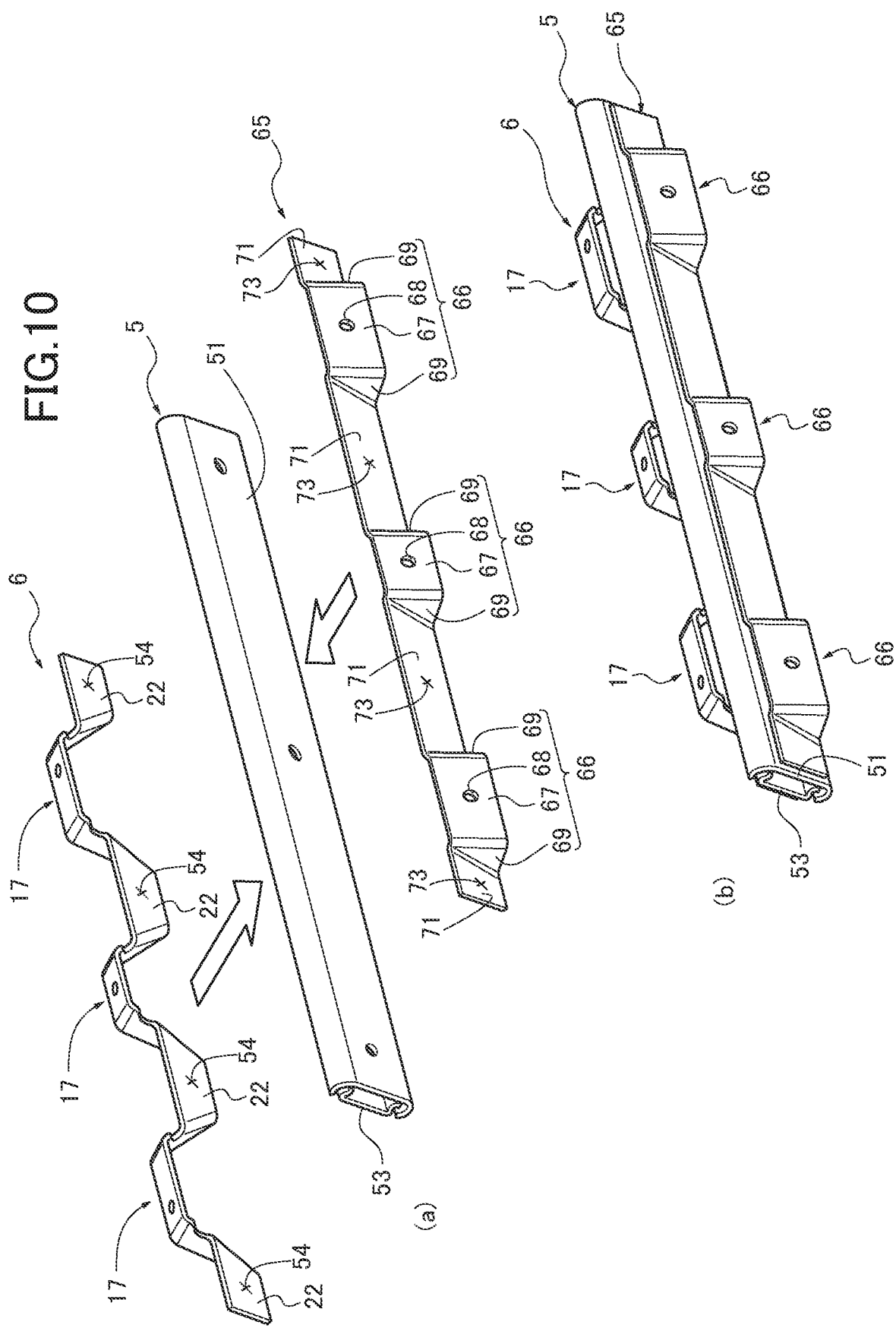
FIG. 10 is an exploded perspective view illustrating the attachment of the bracket and another bracket to the slide rail according to the second embodiment, (a) illustrating before the attachment, and (b) illustrating after the attachment.

FIGS. 8 to 10 illustrate a second embodiment in which the slide rail 5 is indirectly fastened. The slide rail 5 is indirectly fastened by providing another bracket 65 between the cover 7 and the slide rail 5, for example. Another bracket 64 closely contacts the slide rail 5, and another bracket 65 closely contacts the inner surface of the cover 7. With this configuration, the slide rail 5 can be defined such that the sliding direction (drawing direction nX1, storage direction X2) is accurately aligned with the front-back direction X of the cover 7 (drawer-type storage box 2) as seen from the above. It is therefore unnecessary to provide another fixing portion in addition to the fixing member 39, so as to accurately align the sliding direction of the slide rail 5 with the front-back direction X of the cover 7 (drawer-type storage box 2) as seen from the above.

More specifically, another bracket 65 is a mounting bracket for mounting the slide rail 5 on the cover 7. Another bracket 65 is disposed outside each of the inclined slide rail 5 in the width direction Y. A pair of another brackets 65 is provided on both of the left and right sides of the drawer-type storage box 2 in the width direction Y. Another bracket 65 may be referred to as a lower bracket (or second bracket) located under the bracket 6.

As illustrated in FIG. 10 (a), (b), another bracket 65 is provided with a contact portion 66 (cover contact surface) that contacts the inner surface of the rail attachment portion 38. In this case, in the first embodiment, the rail attachment portion 38 is the inclined surface that is provided in each of the left and right side surface portions 35, 36 of the lower cover 31 and has the same inclination as the inclination angle 55 of the slide rail 5 (FIG. 5), while in the second embodiment, a level different portion similar to the level difference portion 27 is provided under the level difference portion 27 of the container 4 in each of the left and right side surface portions 35, 36 of the lower cover 31, and the slide rail 5 is disposed in the space provided between both of the level difference portions in the vertical direction Z (FIG. 8).

The upper portion of the level difference surface in the level difference portion of the left and right side surface portions 35, 36 of the lower cover 31 is mainly used as the rail attachment portion 38. The left and right side surface portions 35, 36 of the lower cover 31 have substantially the same inclination angle between the upper portions and the lower portions of the level difference portions. The level difference surface of the level difference portion 27 of the container 4 and the level difference surface of the level difference portion of the lower cover 31 are substantially parallel to the width direction Y.

Another bracket 65 may be provided with a support portion 65a with which another bracket 65 contacts the level difference surface of the level different portion from the upper side, and is supported by the level difference surface from the lower side, such that another bracket 65 is positioned in the vertical direction Z. The contact portion 66 includes a vertically directed contact surface 67 that contacts the inner surface of the rail attachment portion 38, and the contact surface 67 is provided with an attachment hole 68 for attaching the fixing member 39.

The fixing member 39 is attached between the rail attachment portion 38 and the contact surface 67, so that the fixing member 39 is used as the stop point (or attachment point) between the lower cover 31 and the slide rail 5. A plurality of stop points are provided between the rail attachment portion 38 and the contact surface 67 with intervals (for example, three positions, front, back, and middle) in the front-back direction X. Accordingly, another bracket 65 has a plurality of contact surfaces 67 in accordance with the number of stop points. The contact surface 67 may be provided in the approximate same position as that of the receiving surface 18 of the bracket 6 in the front-back direction X.

The contact portion 66 includes, on both sides of the contact surface 67 (in front-back direction X), curved portions 69 curved in the width direction Y toward the slide rail 5. When the slide rail 5 is seen from the lower side, each of the curved portions 69 on both sides of the contact surface 67 has an inwardly expanded shape or an outwardly narrowed shape that expands toward the slide rail 5. Each curved portion 69 has an approximate triangle shape in a side view for directing the contact surface 67 to the rail attachment portion 38. The approximate triangle portion in the side view has an oblique side that is positioned on the slide rail 5 side and extends in the direction along the inclination of the slide rail 5 and a long side that is positioned on the rail attachment portion 38 side and substantially extends vertically along the rail attachment portion 38.

It is preferable for the left and right another brackets 65 to have a plurality of contact portions 66 to be located in the same positions on the left and light in the front-back direction X. A plurality of contact portions 66 may be separately provided, and may be separately and partially attached to the slide rail 5. A plurality of contact portions 66 may be coupled to each other by a rail contact portion 71, and may be attached to an approximate entire range of the slide rail 5 once. Another bracket 65 in which a plurality of contact portions 66 are coupled may be produced by bending one metal plate to have an approximate convex-concave shape. In this case, the mountain portion of the convex-concave shape is the contact portion 66 and the valley portion of the convex-concave shape is the rail contact portion 71. The rail contact portion 71 extending in the front-back direction X similar to the rail contact portion 71 may be provided in both ends of another bracket 65 (in front-back direction X) in which a plurality of contact portions 66 are coupled by the rail contact portion 71. These rail contact portions 71 contact (surface contact) the slide rail 5. In the section shown in FIG. 8, another bracket 65 may have a shape (V sectional shape) including a bent portion between the contact surface 67 and the rail contact portion 71, the bent portion uniformly continuing in the direction orthogonal to the figure without having the convex-concave shape. This V sectional shape can improve the bending rigidity of another bracket 65.

Another bracket 65 may be fixed to the outer rail 51 by welding (welded portion 73). The welding between another bracket 65 and the outer rail 51 may be spot welding, for example. The spot welding may be performed in a plurality of positions (for example, four positions such as position of rail contact portion 71 between contact portions 66 and position of rail contact portion 71 outside contact portion 66) except the contact portion 66 of another bracket 65 (welded portion 73). The rail contact portion 71 is thereby used as the fixing portion to the slide rail 5. In addition, another bracket 65 is welded to the outer rail 51 only. Another bracket 65 may be attached to the outer rail 51 by screwing or clamp fixing, for example. However, the above-described welding is preferable.

Hereinafter, the operation of the embodiments will be described.

In the drawer-type storage box 2, the container 4 is attached to the cover 7 through the slide rail 5 in a drawable and storable manner, and an item to be stored can be stored in the container 4 through the opening portion of the top portion of the container 4 by drawing forwardly the container 4 stored in the cover 7 from the cover 7 along the slide rail 5. On the other hand, the item to be stored can be stored in the container 4 and the cover 7 by pushing the container 4 in which the item to be stored is stored in the cover 7 along the slide rail 5. When taking out the item to be stored, the container 4 is drawn forwardly from the cover 7 along the slide rail 5.

By providing the slide rail 5 between the cover 7 and the container 4, the container 4 can be smoothly taken in the cover 7 and out from the cover 7 with the slide rail 5. The loads of the item to be stored and the container 4 are applied to the slide rail 5.

By arranging (inclination arrangement) the inclined slide rail 5 (relative to vertical direction Z and width direction Y) between the cover 7 and the container 4, the slide rail 5 can obtain both of the stiffness relative to the load in the vertical direction Z and the stiffness relative to the input from the side. Accordingly, when a passenger gets on a vehicle with the drawer-type storage box 2 being drawn, the configuration that can withstand the impact from the side due to contact of a knee and a hand of the passenger can be obtained. The configuration that can withstand the load in the lateral direction due to traveling vibration of the vehicle V can be also obtained.

Figure 11A:
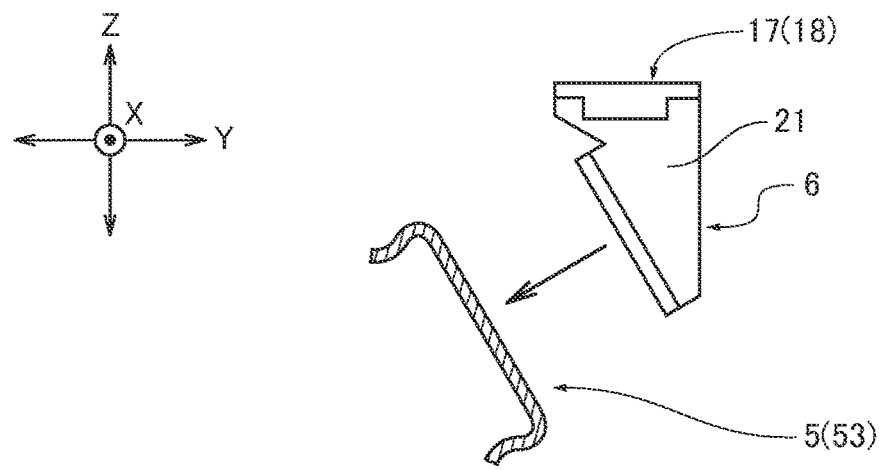
FIG. 11A is an assembling process view of the drawer-type storage box according to the second embodiment.

When assembling the drawer-type storage box 2, as illustrated in FIG. 11A, at first, the bracket 6 is welded to the inner rail 53 of the slide rail 5. In the second embodiment of FIG. 8, another bracket 65 is further welded to the outer rail 51.

Figure 11B:
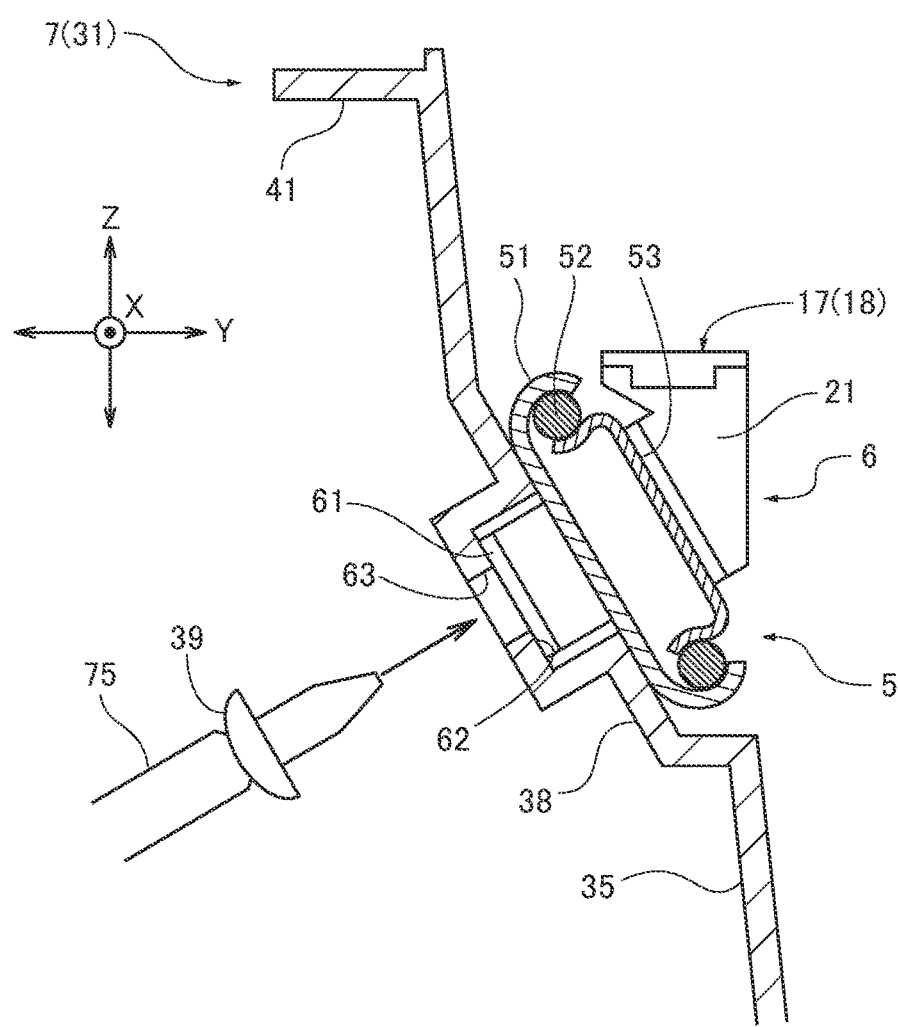
FIG. 11B is an assembling process view of the drawer-type storage box after FIG. 11A.

Next, as illustrated in FIG. 11B, the outer rail 51 (to which bracket 6 is welded) and the inner rail 53 are combined, the outer rail 51 is inclined to the inner surface of the rail attachment portion 38 of the lower cover 31 to be set (contact) from the inside, and the outer rail 51 is laterally directly or indirectly fixed (fastened by screw) to the lower cover 31 by the fixing member 39 from the outside with the tool 75. The slide rail 5 is thereby attached to the lower cover 31.

Figure 11C:
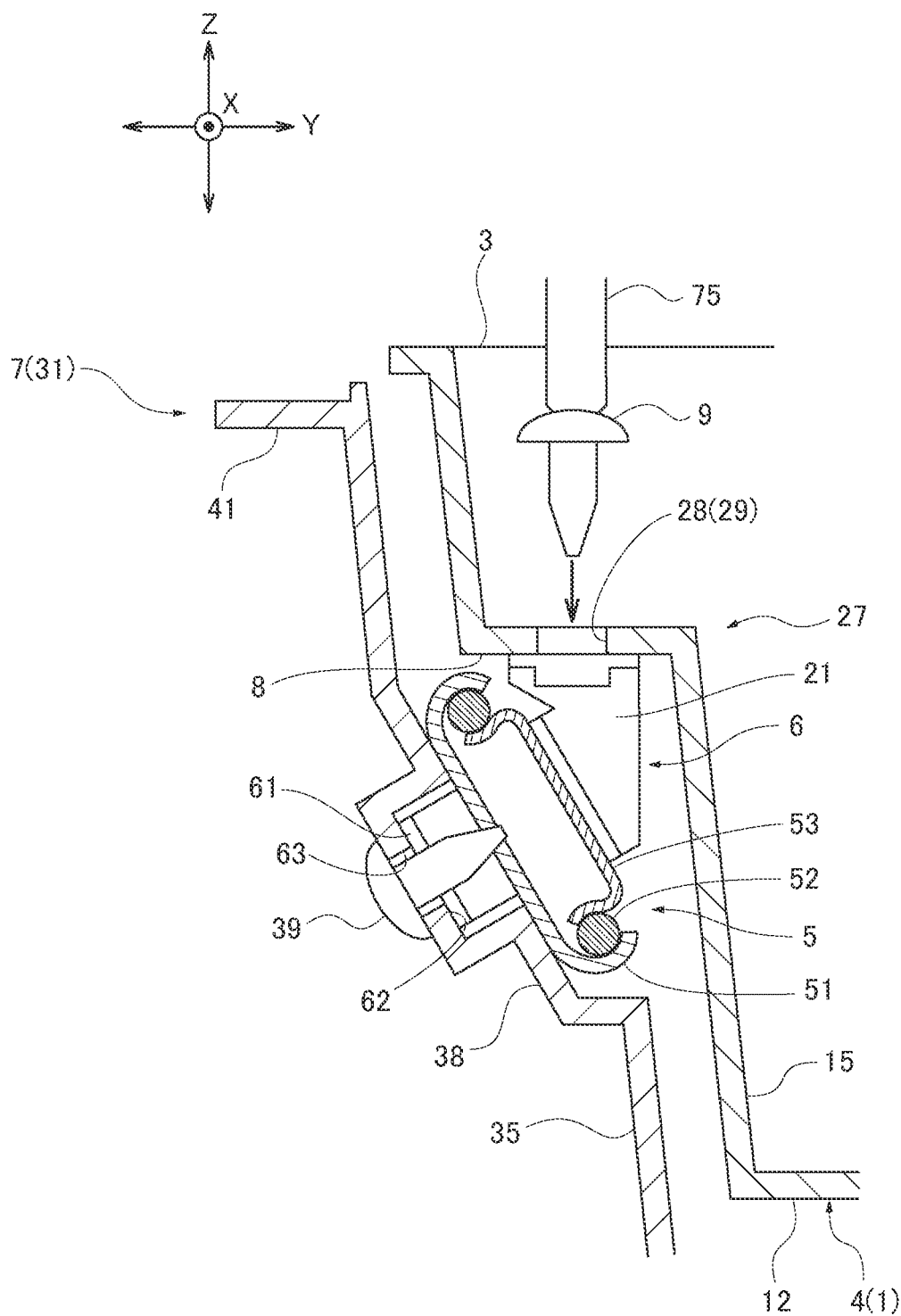
FIG. 11C is an assembling process view of the drawer-type storage box after FIG. 11B.

As illustrated in FIG. 11C, the container 4 is disposed above the slide rail 5 fixed to the lower cover 31, and the container 4 and the bracket 6 attached to the inner rail 53 are fastened by the fastening member 9 from the opening portion 3 side (upper side) with the tool 75, for example. The container 4 is thereby attached to the slide rail 5.

Figure 11D:
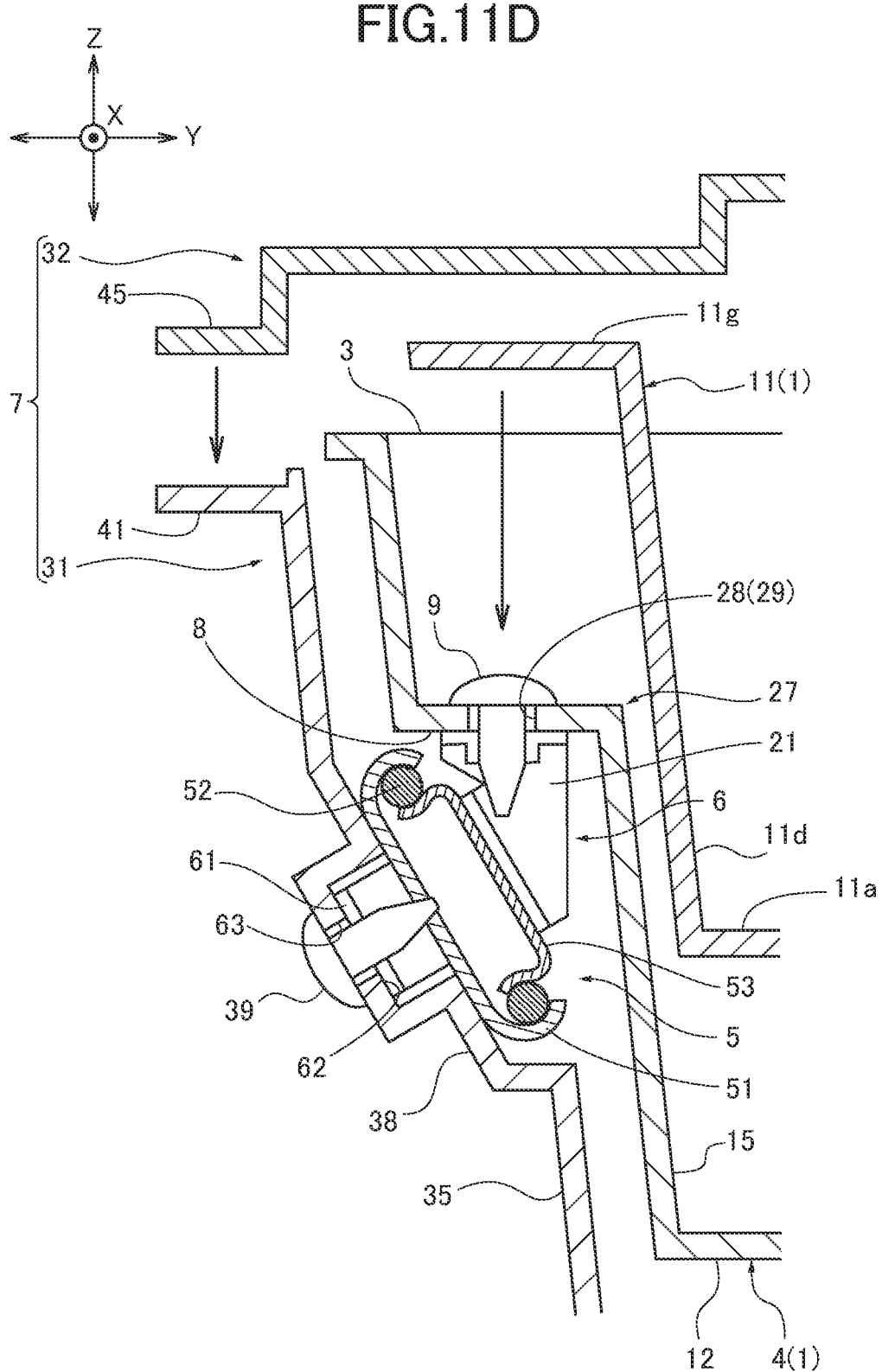
FIG. 11D is an assembling process view of the drawer-type storage box after FIG. 11C.

Finally, as illustrated in FIG. 11D, the upper cover 32 is attached to the lower cover 31 to assemble the cover 7, the container 4 is drawn forwardly from the cover 7, and the tray 11 is set inside the container 4 from the above.

As described above, the drawer-type storage box 2 is assembled with a relatively simple process. In this case, as a fixing operation from the directly underneath or the underneath is not required, a good and effective workability can be obtained.

According to the embodiments, the following effects can be obtained.

Figure 12:
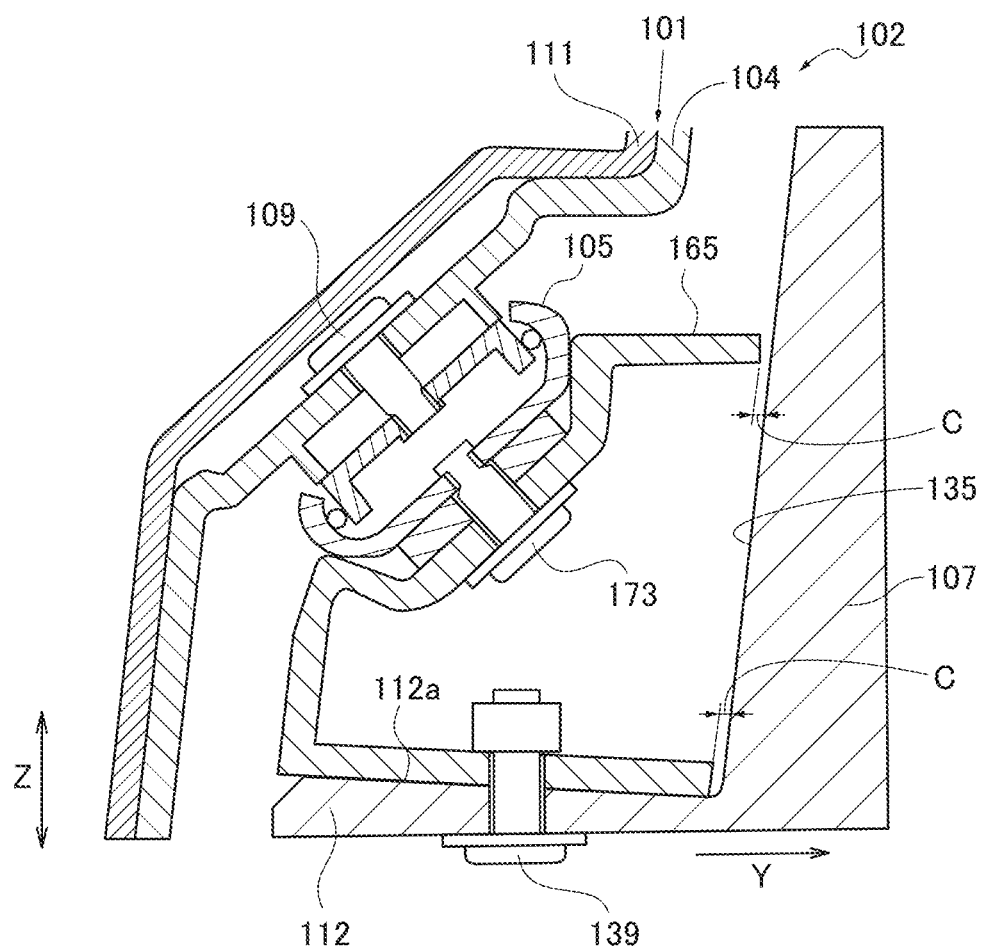
FIG. 12 is a longitudinal sectional view of a disposed portion of a slide rail of a drawer-type storage box according to a comparative example.

(Effect 1) In the drawer-type storage box 2, the container 4 and the inclined slide rail 5 can be fastened downwardly by the fastening member 9 from the opening portion 3 side (upper side) of the container 4. With this configuration, the fastening operation that is performed in the final stage of the assembling from the directly underneath or the underneath can be omitted, so that the workability and the productivity to the assembling of the drawer-type storage box 2 can be improved. On the other hand, as taught in CN104044515B, as shown in FIG. 12, when performing the fastening operation in the final state from the underneath, a bracket 165 (portion whose position varies) that adjusts the position to an outer cover 107 (fixed portion) cannot be visually recognized in the operation to the cover 107 from the below, an operator needs to perform the fastening operation from the underneath while looking at the front (vertical direction to FIG. 12). Such an assembling process has a problem in the workability. On the other hand, in the present embodiments, the fastening operation of the container 4 and the bracket 6 can be performed from the above while visually recognizing the container 4 whose position is adjusted from the above, so that such a problem can be solved.

In the container 4, the contact surface 8 moves in the width direction Y relative to the bracket 6 attached to the slide rail 5 (upper side) by loosening the fastening force of the fastening member 9. The position of the container 4 in the width direction Y can be easily adjusted regardless of the shrinkage amount in the width direction Y even though the resin container 4 (in forming) is shrunk relative to the width direction Y.

In this case, the contact surface 8 of the container 4 that contacts the bracket 6 is substantially parallel to the width direction Y of the container 4. The container 4 can be thereby moved in the width direction Y while always being maintained in a constant height when adjusting the position of the container 4 in the width direction Y, so that the container 4 can be positioned at a constant height regardless of the shrinkage of the container 4 in the width direction Y and the shrinkage amount of the container 4 in the width direction Y. Accordingly, the variation in the upper space between the container 4 and the cover 7 or the instrument panel (finisher) to which the cover 7 is attached can be reduced, so that the appearance can be improved.

(Effect 2) The cover 7 may be separated into the lower cover 31 and the upper cover 32. With this, when the upper cover 32 is removed from the lower cover 31, the cover 7 (upper cover 32) does not disturb the fastening operation of the container 4 and the bracket 6, so that the fastening operation of the contact surface 8 and the bracket 6 with the fastening member 9 from the above can be easily performed.

In the drawer-type storage box 102 of CN104044515B as illustrated in FIG. 12, a slide rail 105 is inclined to an outside surface (inclined portion) of a container 104 constituting a storage portion 101 together with a tray 111, and the container 104 is directly fastened to the slide rail 105 from the oblique above. After that, another bracket 165 is fastened to the lower side of the slide rail 105 from the oblique below with a screw173. Finally, the container 104 is inserted inside the cover 107 together with the slide rail 105 and another bracket 165 to fasten the cover 107 and another bracket 165 upwardly with the screw 139 from a bottom surface 112 side of the cover 7 (directly underneath or underneath), so that the container 104 can be indirectly fixed. Thus, especially in the final stage, it is not easy to fasten the bottom surface 112 of the cover 107 and another bracket 165 from the underneath with the screw 139 while adjusting the size variation due to the shrinkage of the container 4 in the width direction Y.

Accordingly, the basic assembling configuration of the present embodiments differs from that of CN104044515B, and the present embodiments are advantageous in the workability, for example, compared to CN104044515B.

(Effect 3) In the above embodiments, each of the side surfaces 15, 16 of the container 4 have the inclined surface and the contact surface 8, the angle (84° in the above embodiments) of the inclined surface relative to the width direction Y is set to be larger the angle (60°, for example) of the inclination of the slide rail 5. The internal volume of the container 4 can be thereby increased.

(Effect 4) The bracket 6 may be welded to the inner rail 53. As the inner rail 53 mounted inside the outer rail 51 has a width narrower than that of the outer rail 51 (back surface 53a), the inner rail 53 has a stiffness lower than that of the outer rail 51. However, by welding the bracket 6 to the inner rail 53, the inner rail can be reinforced by the bracket 6, so that the stiffness of the inner rail 53 can be improved. By welding the bracket 6, the inner rail 53 is effectively reinforced, and the slide rail 5 can be prevented from being bent and twisted.

(Effect 5) The slide rail 5 may be directly or indirectly fastened to the inner surface of the cover 7 (with another bracket 65). The sliding direction (drawing direction X1 of container 4) of the slide rail 5 can be defined by the inner surface of the cover 7 to be accurately aligned with the front-back direction X of the cover 7 (drawer-type storage box 2) as seen from the above. The configuration in which the slide rail 5 is attached to the inner surface of the cover 7 (inner surface of side surface portion 35, 36) is realizable as long as the position of the container 4 can be adjusted in the width direction Y while maintaining a constant height of the container 4 without providing a clearance between the slide rail 5 and the inside surface of the cover 7 when the container 4 having a shrinkage difference in the Y direction is attached to the inclined slide rail 5.

On the other hand, in CN104044515B of FIG. 12, another bracket 165 (attached to lower side of inclined slide rail 105) is fastened to the bottom surface 112 of the cover 107 upwardly from the underneath. A clearance C is also provided between the inner surface of the cover 107 and the bracket 65 in the width direction Y. By laterally moving another bracket 165 and the slide rail 105 relative to the cover 107 in the width direction Y along the bottom surface 112 of the cover 7 within the range of the clearance C, the space in the vertical direction Z and the height due to the shrinkage of the container 104 in the width direction Y are adjusted. For this reason, a tapered face 112a for adjusting a height is provided in the bottom surface 112 of the cover 7.

However, with this configuration, due to the clearance C in the width direction Y, the slide rail 105 cannot be directly or indirectly fastened to the inner surface of the cover 107. For this reason, in CN104044515B, it is difficult for the drawing direction of the container 104 by the slide rail 105

(direction vertical to figure) to be accurately defined with the side surface portion 135 of the cover 107, so as to be accurately aligned with the front-back direction X of the cover 7 (drawer-type storage box 102) as seen from the above.

This may be adjusted by providing not shown another fixing portion between the back side of the cover 107 (side surface of back side) and the back portion of another bracket 165, for example, such that the drawing direction of the slide rail 105 strengthens from the back side to the front side (such that drawing direction is aligned with front-back direction X as seen from above). However, such a configuration increases the fastening direction of another bracket 165 to the cover 107 to the two directions such as the direction from the underneath and the direction to the back side another fixing portion. The number of working processes is therefore increased.

However, in the present embodiments, the slide rail 5 can be fastened to the inner surface of the cover 7, which can prevent the number of working process of aligning the drawing direction X1 with the front-back direction X as seen the above from being increased. The configuration of the present embodiments is advantageous compared to that of CN104044515B.

Although it is not especially illustrated as an embodiment except the above embodiments, the slide rail 5 and the bracket 6 may be disposed between the bottom surface 12 of the container 4 and the bottom surface 33 of the cover 7, and a flange extending outwardly in the width direction Y may be provided in the upper end of the container 4, and the slide rail 5 and the bracket 6 may be disposed between the flange and the cover 7. In the above embodiments, the angle is defined with the width direction Y as the inclination standard. However, the bottom surface 12 of the container 4 may be used as the standard.

2 drawer-type storage box
3 opening portion
4 container
5 slide rail
6 bracket
7 cover
8 contact surface
9 fastening member
31 lower cover
32 upper cover
35 side surface portion
36 side surface portion
51 outer rail
52 ball
53 inner rail
V vehicle
X front-back direction
X1 drawing direction
Y width direction

The invention claimed is:

1. A storage box mounted on a vehicle, the storage box comprising:
    a container that is box-shaped and formed of resin having on a top thereof an opening;
    a slide rail that extends in a drawing direction of the container and inclines relative to a width direction of the container;
    a bracket that connects the slide rail to the container; and
    a cover that stores the container and to which the slide rail is directly or indirectly attached,
    wherein the container has a contact surface that contacts the bracket and the contact surface is substantially parallel to the width direction of the container,
    wherein a fastening member mounted on an inside of the container fastens the container and the bracket via the contact surface, and
    the container is movable in the width direction relative to the bracket by loosening a fastening force of the fastening member.

2. The storage box according to claim 1, wherein the cover includes a lower cover that supports the slide rail and an upper cover that is separated from the lower cover, couples to the lower cover, and covers the opening portion of the container.

3. The storage box according to claim 1,
    wherein a side surface of the container has the contact surface and an inclination surface inclined relative to the contact surface, and
    wherein an angle of the inclination surface relative to the width direction is larger than an angle of the slide rail relative to the width direction.

4. The storage box according to claim 1,
    wherein the slide rail includes an outer rail that is directly or indirectly fixed to the cover and an inner rail that is mounted inside the outer rail through a ball, and
    wherein the bracket is welded to the inner rail.

5. The storage box according to claim 1, wherein the slide rail is fastened to an inner surface of the cover.

* * * * *